United States Patent
Iguchi

(10) Patent No.: US 9,993,731 B2
(45) Date of Patent: Jun. 12, 2018

(54) INFORMATION STORAGE MEDIUM, SERVER, AND GAME DEVICE

(71) Applicant: BANDAI NAMCO Entertainment Inc., Tokyo (JP)

(72) Inventor: Tadashi Iguchi, Kawasaki (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 0 days. days.

(21) Appl. No.: 15/435,357

(22) Filed: Feb. 17, 2017

(65) Prior Publication Data

US 2017/0239570 A1    Aug. 24, 2017

(30) Foreign Application Priority Data

Feb. 19, 2016   (JP) .................. 2016-029874

(51) Int. Cl.
  *G06F 17/00*   (2006.01)
  *A63F 13/52*   (2014.01)
  *A63F 13/35*   (2014.01)
  *A63F 13/57*   (2014.01)

(52) U.S. Cl.
  CPC .............. *A63F 13/52* (2014.09); *A63F 13/35* (2014.09); *A63F 13/57* (2014.09)

(58) Field of Classification Search
  None
  See application file for complete search history.

(56) References Cited

U.S. PATENT DOCUMENTS 9,827,492 B2 * 11/2017 Yamada .................. A63F 13/45
2005/0176502 A1 *  8/2005 Nishimura .............. A63F 13/10
                                                                    463/31
2009/0070093 A1 *  3/2009 Nakanishi ............... A63F 13/00
                                                                    703/22
2011/0074768 A1 *  3/2011 Takayama ............... G06T 13/80
                                                                    345/419
2011/0214093 A1 *  9/2011 Nishimura ............ G06F 3/0416
                                                                    715/863

OTHER PUBLICATIONS

Jungler. Wikipedia. Web. Jan. 18, 2017. <https://en.wikipedia.org/wiki/Jungler>.
Jungler. Wikipedia Japan. Web. Jan. 18, 2017. <https://ja.wikipedia.org/wiki/%E3%82%B8%E3%83%A3%E3%83%B3%E3%82%B0%E3%83%A9%E3%83%BC>. (with English machine translation; discussed on p. 1 of the specification.)

* cited by examiner

*Primary Examiner* — Ronald Laneau
(74) *Attorney, Agent, or Firm* — Posz Law Group, PLC

(57) ABSTRACT

A computer performs a process for displaying an object string and a player object within a game screen, the object string including a main object, and at least one sub-object that is connected to the main object, the player object being an object that can be operated by a player, and virtual walls that limit a moving direction of each of the main object, the sub-object and the player object being provided within the game screen. The motion of the player object within the game screen is controlled in response to an operation performed by the player. The motion mode of the object string is switched from a first mode to a second mode or a third mode based on a given condition, the second mode being a mode in which the object string is inferior as compared with the first mode, and the third mode being a mode in which the main object is superior as compared with the first mode.

13 Claims, 17 Drawing Sheets

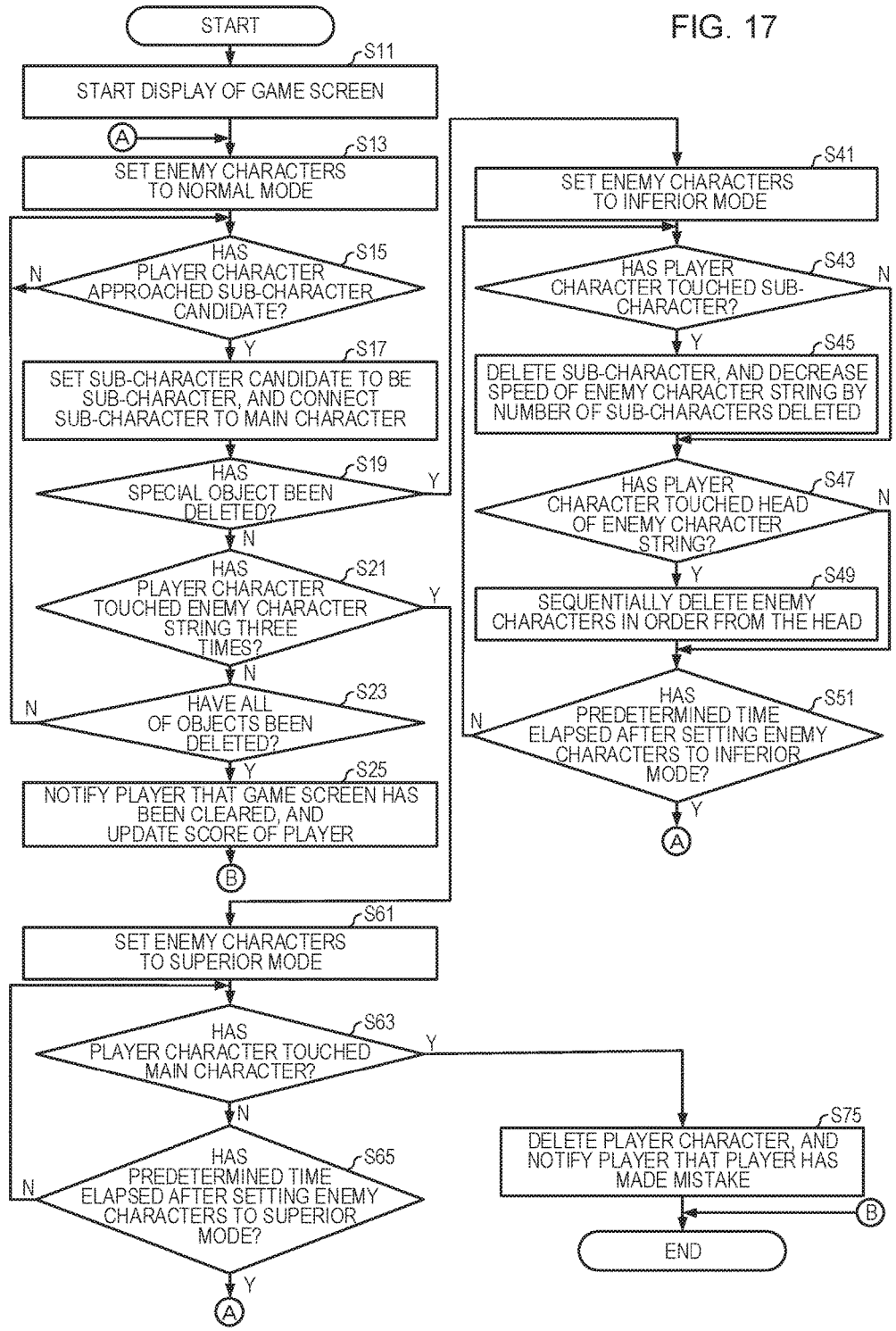

INFORMATION STORAGE MEDIUM, SERVER, AND GAME DEVICE

Japanese Patent Application No. 2016-029874, filed on Feb. 19, 2016, is hereby incorporated by reference in its entirety.

BACKGROUND OF THE INVENTION

The present invention relates to an information storage medium, a server, and a game device.

A game (tag game) that allows the player to chase or escape from an enemy character in a maze formed within a game screen is known (see https://ja.wikipedia.org/wiki/%E3%82%B8%E3%83%A3%E3%83%B3%E3%82%-B0%E3%83%A9%E3%83%BC, for example). For example, the game described in https://ja.wikipedia.org/wiki/%E3%82%B8%E3%83%A3%E3%83%B3%-E3%82%B0%E3%83% A9%E3%83%BC is designed so that the player causes a snake-like player character that can move in a maze to chase and attack a snake-like enemy character that can move in the maze. The game described in https://ja.wikipedia.org/wiki/%E3%82%B8%E3%83%A-3%E3%83%B3%E3%82%B0%E3%83%A9%E3%83%BC increases the attack difficulty level by allowing the player to attack only the tail of the enemy character.

However, since the game described in https://ja.wikipedia.org/wiki/% E3%82%B8%E3%83%A3%E3%-83%B3%E3%82%B0%E3%83%A9%E3%83%BC is basically designed so that the enemy character and the player character do not differ to a large extent as to the outward appearance, it is difficult for the player to have an empathy with the player character, and have negative feelings with respect to the enemy character. The game may be designed so that the enemy character and the player character differ in outward appearance. However, the mental effect of the difference in outward appearance on the player normally decreases during the game.

SUMMARY

Several aspects of the invention may provide an information storage medium, a server, a game device, and the like that implement a process that emphasizes the individuality of an object that appears within a game screen by means of a simple motion.

According to a first aspect of the invention, there is provided a computer-readable non-transitory information storage medium storing a program that causes a computer to implement a game, the program causing the computer to function as:

a display control section that performs a process that displays an object string and a player object within a game screen, the object string including a main object, and at least one sub-object that is connected to the main object, the player object being an object that can be operated by a player, and virtual walls that limit a moving direction of each of the main object, the sub-object and the player object being provided within the game screen;

an object control section that controls a motion of the object string within the game screen in a first mode, and controls a motion of the player object within the game screen in response to an operation performed by the player; and a mode switch section that switches a motion mode of the object string from the first mode to a second mode when the player object has satisfied a predetermined condition, the second mode being a mode in which the object string is inferior as compared with the first mode, wherein the mode switch section switches the motion mode of the main object to a third mode when the player object and the sub-object have satisfied a predetermined positional relationship condition in a state in which the object string has been set to the first mode, the third mode being a mode in which the main object is superior as compared with the first mode.

According to a second aspect of the invention, there is provided a server that implements a game, the server including:

a display control section that performs a process that displays an object string and a player object within a game screen, the object string including a main object, and at least one sub-object that is connected to the main object, the player object being an object that can be operated by a player, and virtual walls that limit a moving direction of each of the main object, the sub-object and the player object being provided within the game screen;

an object control section that controls a motion of the object string within the game screen in a first mode, and controls a motion of the player object within the game screen in response to an operation performed by the player; and a mode switch section that switches a motion mode of the object string from the first mode to a second mode when the player object has satisfied a predetermined condition, the second mode being a mode in which the object string is inferior as compared with the first mode, wherein the mode switch section switches the motion mode of the main object to a third mode when the player object and the sub-object have satisfied a predetermined positional relationship condition in a state in which the object string has been set to the first mode, the third mode being a mode in which the main object is superior as compared with the first mode.

According to a third aspect of the invention, there is provided a game device that implements a game, the game device including:

a display control section that performs a process that displays an object string and a player object within a game screen, the object string including a main object, and at least one sub-object that is connected to the main object, the player object being an object that can be operated by a player, and virtual walls that limit a moving direction of each of the main object, the sub-object and the player object being provided within the game screen;

an object control section that controls a motion of the object string within the game screen in a first mode, and controls a motion of the player object within the game screen in response to an operation performed by the player; and a mode switch section that switches a motion mode of the object string from the first mode to a second mode when the player object has satisfied a predetermined condition, the second mode being a mode in which the object string is inferior as compared with the first mode, wherein the mode switch section switches the motion mode of the main object to a third mode when the player object and the sub-object have satisfied a predetermined positional relationship condition in a state in which the object string has been set to the first mode, the third mode being a mode in which the main object is superior as compared with the first mode.

BRIEF DESCRIPTION OF THE SEVERAL VIEWS OF THE DRAWING

FIG. 17 is a flowchart illustrating the flow of a game process that is performed by a terminal device 20.

Figure 1:
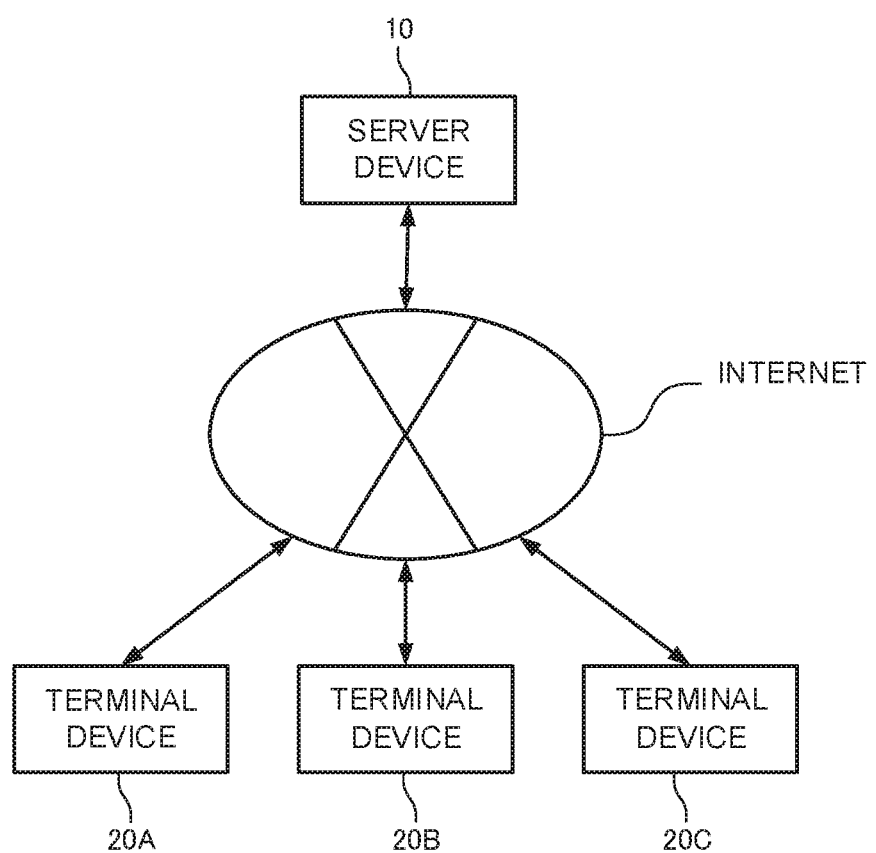
FIG. 1 illustrates an example of the system configuration of a game system according to one embodiment of the invention.

DETAILED DESCRIPTION OF THE EMBODIMENT (1) According to one embodiment of the invention, a computer-readable non-transitory information storage medium stores a program that causes a computer to implement a game, the program causing the computer to function as:

a display control section that performs a process that displays an object string and a player object within a game screen, the object string including a main object, and at least one sub-object that is connected to the main object, the player object being an object that can be operated by a player, and virtual walls that limit a moving direction of each of the main object, the sub-object and the player object being provided within the game screen;

an object control section that controls a motion of the object string within the game screen in a first mode, and controls a motion of the player object within the game screen in response to an operation performed by the player; and a mode switch section that switches a motion mode of the object string from the first mode to a second mode when the player object has satisfied a predetermined condition, the second mode being a mode in which the object string is inferior as compared with the first mode, wherein the mode switch section switches the motion mode of the main object to a third mode when the player object and the sub-object have satisfied a predetermined positional relationship condition in a state in which the object string has been set to the first mode, the third mode being a mode in which the main object is superior as compared with the first mode.

According to another embodiment of the invention, a server implements a game, the server including:

a display control section that performs a process that displays an object string and a player object within a game screen, the object string including a main object, and at least one sub-object that is connected to the main object, the player object being an object that can be operated by a player, and virtual walls that limit a moving direction of each of the main object, the sub-object and the player object being provided within the game screen;

an object control section that controls a motion of the object string within the game screen in a first mode, and controls a motion of the player object within the game screen in response to an operation performed by the player; and a mode switch section that switches a motion mode of the object string from the first mode to a second mode when the player object has satisfied a predetermined condition, the second mode being a mode in which the object string is inferior as compared with the first mode, wherein the mode switch section switches the motion mode of the main object to a third mode when the player object and the sub-object have satisfied a predetermined positional relationship condition in a state in which the object string has been set to the first mode, the third mode being a mode in which the main object is superior as compared with the first mode.

Note that the mode in which the object is superior and the mode in which the object is inferior differ from each other as to the power of the object. Specifically, the power of the object in the mode in which the object is superior is higher than the power of the object in the mode in which the object is inferior. The term "power" used herein in connection with the object refers to the possibility that the object induces the player to make a mistake (i.e., cause the player character to disappear, or to be damaged), and can be set using at least one of the moving speed of the object, the attack capability of the object, and the movement type (movement tendency) of the object, for example.

The predetermined positional relationship condition is satisfied when the distance between the player object and the sub-object has become less than a predetermined threshold value (including a case where the player object has touched the sub-object), or when the distance between the player object and the sub-object has been maintained to be less than the threshold value for a predetermined time, or when the player object has touched the sub-object one or more times, for example.

According to the program, the object string can be switched between the first mode in which the object string is relatively superior, and the second mode in which the object string is relatively inferior, and at least the main object can also be switched to the third mode in which the object string is more superior. Moreover, the main object set to the first mode is set to the third mode in response to a motion (e.g., approach motion or touch motion) performed with respect to the sub-object instead of the main object. Therefore, the player is given an impression that the main object holds a sense of unity with respect to the sub-object. This makes it possible to emphasize the reaction of the main object when the mode is switched from first mode to the third mode, and prompt the player to become tense.

(2) In the information storage medium and the server, the player object may be damaged when the main object in the third mode and the player object have satisfied a predetermined positional relationship condition.

The predetermined positional relationship condition is satisfied when the distance between the main object and the player object has become less than a predetermined threshold value (including a case where the player object has touched the main object), or when the distance between the main object and the player object has been maintained to be less than the threshold value for a predetermined time, or when the player object has touched the main object one or more times, for example.

The player is disadvantaged when the player object is damaged. For example, the score of the player is decreased, or the player object is deleted from the game screen (player's mistake), or the probability that the player object is deleted from the game screen is increased.

This makes it possible to prompt the player to prevent a situation in which the main object is set to the third mode.

(3) In the information storage medium and the server, the object string in the first mode may move so that the sub-object leads the object string.

In this case, the object string makes a motion as if the main object were using the sub-object as a shield. Therefore, the player is given an impression that the main object is cowardly.

(4) In the information storage medium and the server, the object string in the second mode may move so that the main object leads the object string.

In this case, the object string makes a motion as if the main object were leading the escape. Therefore, the player is given an impression that the main object is selfish.

(5) In the information storage medium and the server, the object string moves in a state in which the object string has a reduced total length when the main object is in the third mode.

Examples of the state in which the object string has a reduced total length include a state in which part or the entirety of the sub-object is hidden behind the main object (e.g., a state in which the main object overlaps the sub-object), and the like.

When the sub-object is hidden behind the main object, the object string makes a motion as if the main object were protecting the sub-object. Therefore, the player may be given an impression that the main object is strong.

(6) In the information storage medium and the server, the mode switch section may set a limit to the time in which the main object is in the third mode.

It is considered that the player is psychologically affected in an advantageous way by setting a time limit, and it is possible to prompt the player to become tenser in the third mode, since a human normally cannot maintain a tense state for a long time.

(7) In the information storage medium and the server, the program may cause the computer to further function as a game management section that provides a bonus to the player when the player object has satisfied a predetermined clear condition relating to the game screen in a state in which the main object has not been set to the third mode.

This makes it possible to prompt the player to obtain a bonus by preventing a situation in which the main object is set to the third mode.

(8) In the information storage medium and the server, the game management section may provide the bonus to the player when the player object has satisfied a predetermined clear condition relating to the game screen without touching or approaching the object string.

The expression "the player object has satisfied a predetermined clear condition without touching or approaching the object string" includes a case where the player object has satisfied a predetermined clear condition while maintaining the distance from the object string to be equal to or more than a predetermined threshold value. For example, the expression "the player object has satisfied a predetermined clear condition without touching or approaching the object string" includes a case where the player object has satisfied a predetermined clear condition without touching the object string.

This makes it possible to prompt the player to obtain a bonus by preventing a situation in which the player object touches or approaches the object string.

(9) In the information storage medium and the server, when the player object has touched or approached an object that is at least one of the main object and the sub-object in the object string in a state in which the object string is in the second mode, the object control section may delete the object to decrease the number of objects included in the object string, and the program may cause the computer to further function as a game management section that upgrades the score of the player as the number of objects that have been successively deleted increases.

The expression "the player object has touched or approached an object" includes a case where the distance between the object and the player object has become equal to or less than a predetermined threshold value. For example, the expression "the player object has touched or approached an object" includes a case where the player object has touched the object.

Specifically, the player can decrease the total length of the object string by causing the player object to touch or approach an object that is included in the object string, and upgrade the score by successively deleting a plurality of objects included in the object string.

(10) In the information storage medium and the server, when the number of objects included in the object string has decreased, the object control section may decrease the moving speed of the object string according to the number of objects that have been deleted.

This makes it possible to provide a trade-off relationship in which, as the number of objects included in the object string increases, it becomes more difficult for the player to cause the player object to chase the object string since the object string moves at a higher speed, but it is likely that the player can acquire higher points since a larger number of objects can be successively deleted.

(11) In the information storage medium and the server, when a candidate object that is a candidate for the sub-object and has been placed within the game screen in advance by the display control section satisfies a predetermined condition, the display control section may set the candidate object to be the sub-object and connect the sub-object to the main object.

It is determined that the candidate object has satisfied the predetermined condition when the elapsed time from the appearance of the candidate object has exceeded a predetermined threshold value, or when the distance between the candidate object and the player object has become equal to or less than a threshold value, for example.

When it is determined that the candidate object has satisfied the predetermined condition when the elapsed time from the appearance of the candidate object has exceeded a predetermined threshold value, the player can increase the number of objects connected with the object string by waiting for the elapsed time to exceed the predetermined threshold value. When it is determined that the candidate object has satisfied the predetermined condition when the distance between the candidate object and the player object has become equal to or less than a threshold value, the player can intentionally control the number of sub-objects connected to the object string.

(12) According to another embodiment of the invention, a game device implements a game, the game device including:

a display control section that performs a process that displays an object string and a player object within a game screen, the object string including a main object, and at least one sub-object that is connected to the main object, the player object being an object that can be operated by a player, and virtual walls that limit a moving direction of each of the main object, the sub-object and the player object being provided within the game screen;

an object control section that controls a motion of the object string within the game screen in a first mode, and controls a motion of the player object within the game screen in response to an operation performed by the player; and a mode switch section that switches a motion mode of the object string from the first mode to a second mode when the player object has satisfied a predetermined condition, the second mode being a mode in which the object string is inferior as compared with the first mode, wherein the mode switch section switches the motion mode of the main object to a third mode when the player object and the sub-object have satisfied a predetermined positional relationship condition in a state in which the object string has been set to the first mode, the third mode being a mode in which the main object is superior as compared with the first mode.

Note that part or the entirety of the functions of the game device may be implemented by a server device and a terminal device. Part or the entirety of the program may be recorded on an information storage medium.

Exemplary embodiments of the invention are described below. Note that the exemplary embodiments described below do not in any way limit the scope of the invention defined by the claims laid out herein. Note also that all of the elements described below in connection with the exemplary embodiments should not necessarily be taken as essential elements of the invention.

1. Game System

An outline and a schematic configuration of a game system 1 according to one embodiment of the invention are described below with reference to FIG. 1. Note that FIG. 1 illustrates an example of the configuration of the game system 1.

As illustrated in FIG. 1, the game system 1 is configured so that a server device 10 that provides a game service and a terminal device 20 (e.g., terminal devices 20A, 20B, and 20C) can connect to the Internet (i.e., network).

The user (player) can access the server device 10 from the terminal device 20 through the Internet, and play the game that is transmitted from the server device 10 through the Internet. The player can communicate with another player by accessing the server device 10 from the terminal device 20.

The server device 10 is an information processing device that can provide a service that allows the player to play the game using the terminal device 20 that is communicably connected to the server device 10 through the Internet. The server device 10 may also function as an SNS server that provides a communication-type service. The SNS server may be an information processing device that provides a service that allows a plurality of players to communicate with each other.

When the server device 10 functions as the SNS server, for example, the server device 10 can provide a game that is referred to as a social game that is implemented by utilizing the operating environment (e.g., application programming interface (API) or platform) provided by the SNS.

The server device 10 can provide a game that is provided on a web browser that runs on the terminal device 20 (e.g., a browser game (i.e., a game that starts when the user has opened the game website using the web browser) written in an arbitrary language (e.g., HTML, FLASH, CGI, PHP, shockwave, Java (registered trademark) applet, or JavaScript (registered trademark))).

Note that the term "social game" used herein includes a game that does not require dedicated client software (differing from existing online games), and can be played using only a web browser and an SNS account. The server device 10 is configured to be able to provide an online game that is designed so that each terminal connects to a terminal (e.g., smartphone, personal computer, or game device) of another player through a network, and the terminals share the game online.

The server device 10 may include a single device or processor, or may include a plurality of devices or processors.

Information (e.g., charge information and game information) that is stored in a storage area (storage section 140 described later) of the server device 10 may be stored in a database (storage device or memory in a broad sense) that is connected to the server device 10 through a network (intranet or Internet). When the server device 10 functions as the SNS server, information (e.g., user information 146) that is stored in the storage area may be stored in a database (storage device or memory in a broad sense) that is connected to the server device 10 through a network (intranet or Internet).

More specifically, the server device 10 receives input information based on the operation performed by the player (i.e., the player who plays the game) who uses the terminal device 20, and performs a game process based on the received input information. The server device 10 transmits the game processing results to the terminal device 20, and the terminal device 20 performs various processes that provide the game processing results received from the server device 10 to the player so that the player can view the game processing results.

The terminal device 20 is an information processing device such as a smartphone, a mobile phone, a PHS, a computer, a game device, a PDA, a portable game machine, or an image generation device, and can connect to the server device 10 through a network (e.g., Internet (WAN) and LAN). Note that the terminal device 20 and the server device 10 may be connected to each other through a cable communication channel, or may be connected to each other through a wireless communication channel.

The terminal device 20 is provided with a web browser that allows the player to browse a web page (HTML format data). Specifically, the terminal device 20 has a communication control function for communicating with the server device 10, a web browser function for displaying an image using data (e.g., web data or HTML data) received from the server device 10, and transmitting data that represents the operation performed by the player to the server device 10, and the like. The terminal device 20 performs various processes that provide a game screen to the player, and allows the player to play the game. Note that the terminal device 20 may acquire game control information from the server device 10, and perform a predetermined game process to implement a game based on the game process.

More specifically, when the terminal device 20 has transmitted a game play request (i.e., a request for playing a specific game) to the server device 10, the terminal device 20 is connected to the game website provided by the server device 10, and the game starts. The terminal device 20 is configured to cause the server device 10 that functions as an SNS server to perform a predetermined process, or acquire the user information 146 that is managed by the server device 10 that functions as an SNS server optionally using an API, and implements the game.

2. Server Device

Figure 2:
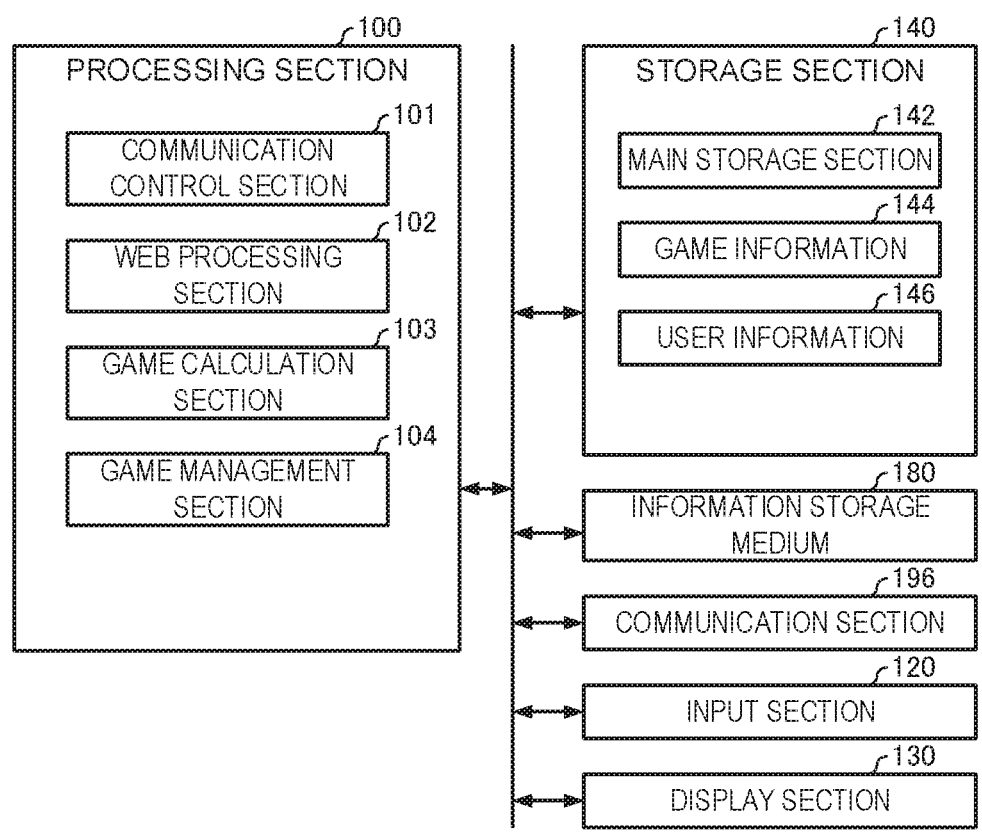
FIG. 2 is an example of a functional block diagram illustrating the configuration of a server device.

The server device 10 is described below with reference to FIG. 2. Note that FIG. 2 is a functional block diagram illustrating the server device 10. The server device 10 may have a configuration in which some of the elements (sections) illustrated in FIG. 2 are omitted.

The server device 10 includes an input section 120 that allows the administrator and the like to input information, a display section 130 that displays a predetermined screen, an information storage medium 180 that stores predetermined information, a communication section 196 that communicates with the terminal device 20 and the like, a processing section 100 that mainly performs a process that implements the game that is provided by the server device 10, and a storage section 140 that mainly stores various types of data used to implement the game.

The input section 120 allows the system administrator and the like to input game settings, other necessary settings, and data. For example, the input section 120 is implemented by a mouse, a keyboard, or the like.

The display section 130 displays an operation screen for the system administrator. For example, the display section 130 is implemented by a liquid crystal display or the like.

The information storage medium 180 (computer-readable medium) stores a program, data, and the like. The function of the information storage medium 180 is implemented by an optical disk (CD or DVD), a magneto-optical disk (MO), a magnetic disk, a hard disk, a magnetic tape, a memory (ROM), or the like.

The communication section 196 performs a control process for communicating with the outside (e.g., terminal, another server, or another network system). The function of the communication section 196 is implemented by hardware such as a processor or a communication ASIC, a program, or the like.

The storage section 140 serves as a work area for the processing section 100, the communication section 196, and the like. The function of the storage section 140 is implemented by a RAM (VRAM) or the like. Note that the information stored in the storage section 140 may be managed using a database.

The game system 1 is designed so that the storage section 140 stores game information 144 that represents information about the game that is provided by the server device 10, the user information 146 that represents information about the player who plays the game that is provided by the server device 10, and various types of information necessary for the game calculation process.

The processing section 100 performs various processes using a main storage section 142 included in the storage section 140 as a work area. The function of the processing section 100 may be implemented by hardware such as a processor (e.g., CPU or DSP) or an ASIC (e.g., gate array), or a program.

The processing section 100 performs various processes that implement the game system 1 based on a program (data) stored in the information storage medium 180. Specifically, a program that causes a computer to function as each section of the game system 1 (i.e., a program that causes a computer to execute the process implemented by each section) is stored in the information storage medium 180.

For example, the processing section 100 (processor) performs various processes (e.g., a process that controls the entire server device 10, and a process that controls data transfer between each section) based on the program stored in the information storage medium. The processing section 100 also performs a process that provides various services in response to a request from the terminal device 20.

More specifically, the processing section 100 includes at least a communication control section 101, a web processing section 102, and a game management section 104.

The communication control section 101 performs a process that exchanges data with the terminal device 20 through a network. Specifically, the server device 10 performs various processes based on information received from the terminal device 20 and the like through the communication control section 101.

The communication control section 101 performs a process that transmits a game screen to the terminal device 20 of the player based on a request from the terminal device 20 of the player.

The web processing section 102 functions as a web server. For example, the web processing section 102 performs a process that transmits data in response to a request from the web browser installed on the terminal device 20 by means of a communication protocol such as Hypertext Transfer Protocol (HTTP), and performs a process that receives data transmitted by the web browser installed on the terminal device 20.

Although an example in which the server device 10 also functions as the SNS server is described below, the server device 10 may be implemented by a game server and an SNS server that are provided separately from each other. Part or the entirety of the game process implemented by the game system 1 may be implemented by the server device 10, or part or the entirety of the game process implemented by the game system 1 may be implemented by the terminal device 20.

The game management section 104 performs the game process that implements a role-playing game (RPG) or a battle game that is played by each player in cooperation with the terminal device 20 based on the operation input by the player using the terminal device 20, and manages the user information 146 (e.g., information that represents the progress of the game played by each player, item management, a character and various items used by each player).

Note that the game management section 104 may perform an automatic calculation process that automatically implements the game based on various types of data set by the player instead of the operation performed by the player to generate data for the terminal device 20 to reproduce (replay) the game, and transmit the generated data to the terminal device 20.

3. Terminal Device

Figure 3:
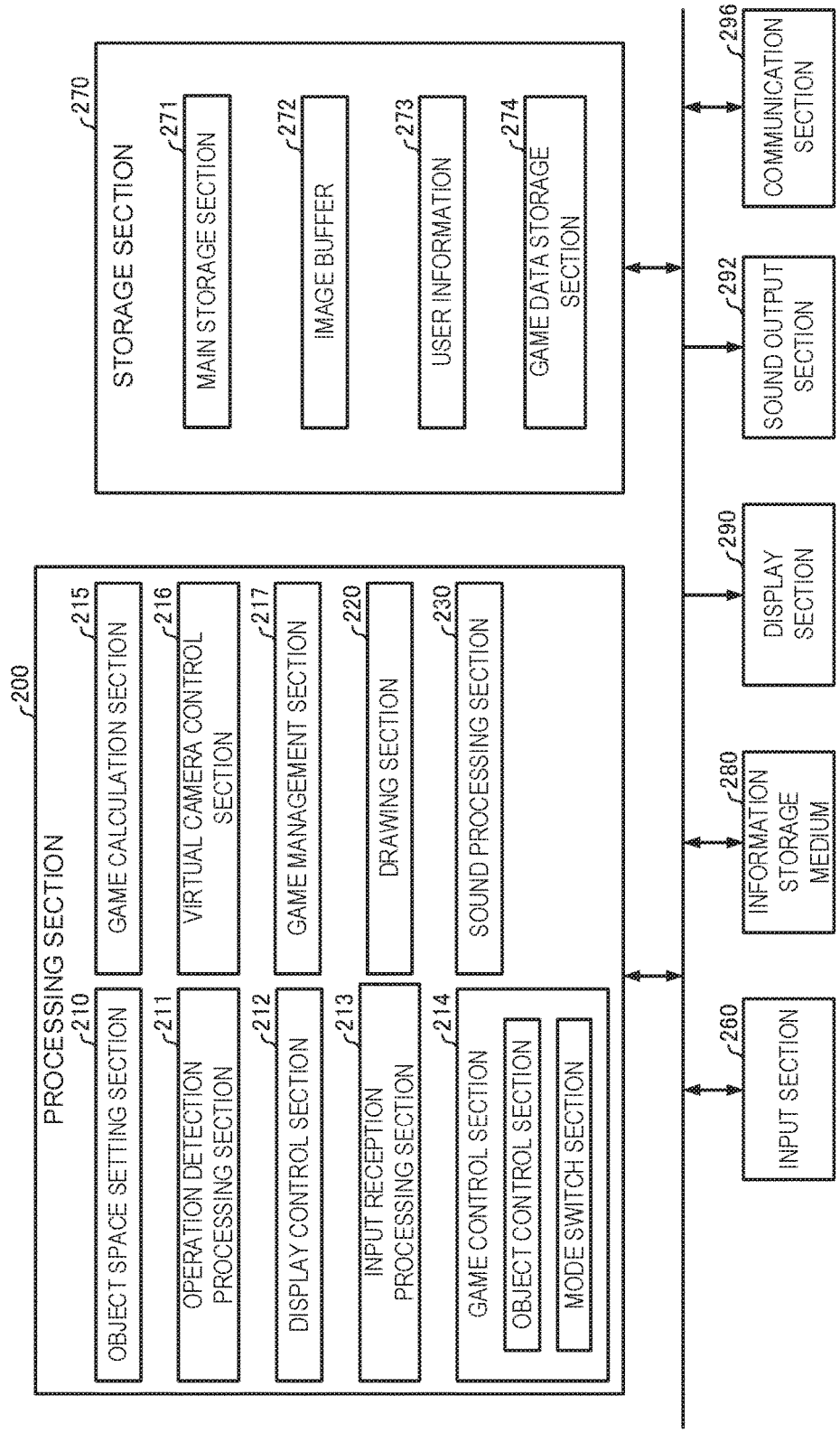
FIG. 3 is an example of a functional block diagram illustrating the configuration of a terminal device.

The terminal device 20 is described below with reference to FIG. 3. Note that FIG. 3 is an example of a functional block diagram illustrating the configuration of the terminal device 20. The terminal device 20 may have a configuration in which some of the elements (sections) illustrated in FIG. 3 are omitted.

The input section 260 allows the player to input an operation instruction for operating a character. The function of the input section 260 is implemented by a controller (e.g., an arrow key, a joystick, a steering wheel, a keyboard, or a touch panel) that is formed in the real space in which the player inputs an operation instruction, or a device (e.g., a lever, a handle, a button, or a card and a field board that recognizes the position and the type of the card) that is formed in the real space. Note that at least part of the input section 260 may be implemented by a virtual controller that is displayed on a display screen (e.g., touch panel). In this case, when the user has performed an operation (e.g., touch operation) on the virtual controller, the input section 260 (virtual controller) generates a signal that corresponds to the operation performed by the user, and transmits the signal to a processing section 200. Note that the motion of the virtual controller on the touch panel is controlled by a game control section 214, a display control section 212, and the like.

The input section 260 may further include an acceleration sensor, a line-of-sight detection sensor, and the like. When a display section 290 is implemented by an HMD, the input section 260 is used to implement a process that detects the direction of the head of the player, the line-of-sight direction of the player, and the like in cooperation with the display section 290, and displays an image of a game space based on the viewpoint of the player on the display section 290.

A storage section 270 serves as a work area for the processing section 200, a communication section 296, and the like. The function of the storage section 270 may be implemented by a RAM (VRAM) or the like. The storage section 270 includes a main storage section 271 that is used as a work area, an image buffer 272 that stores the final display image and the like, user information 273 that represents information about the player who plays the game that is provided by the server device 10, and a game data storage section 274 that stores various types of data (e.g., table data) necessary for implementing the game. Note that the storage section 270 may have a configuration in which some of these sections (information) are omitted, or some of these sections (information) may be implemented by the storage section 140 included in the server device 10.

An information storage medium 280 (computer-readable medium) stores a program, data, and the like. The function of the information storage medium 280 may be implemented by an optical disk (CD or DVD), a magneto-optical disk (MO), a magnetic disk, a hard disk, a magnetic tape, a memory (ROM), or the like.

A program that causes a computer to function as each section of the game system 1 (i.e., a program that causes a computer to execute the process implemented by each section) may be stored in the information storage medium 280. Note that the processing section 200 performs various processes implemented by the game system 1 based on the program (data) stored in the information storage medium 280 (as described later).

The display section 290 outputs an image generated by the game system 1. The function of the display section 290 may be implemented by a CRT, an LCD, a touch panel display, a head-mounted display (HMD), or the like. A resistive (4-wire or 5-wire) touch panel, a capacitive touch panel, an electromagnetic induction touch panel, an ultrasonic surface acoustic wave touch panel, an infrared scan touch panel, or the like may be used as the touch panel.

A sound output section 292 outputs a sound generated by the game system 1. The function of the sound output section 292 may be implemented by a speaker, a headphone, or the like.

The communication section 296 performs various control processes for communicating with the outside (e.g., host device or another terminal device). The function of the communication section 296 may be implemented by hardware such as a processor or a communication ASIC, a program, or the like.

Note that the terminal device 20 may receive a program and data that are stored in the information storage medium or the storage section 270 included in the server device 10 and cause a computer to function as each section of the game system 1 through a network, and store the received program and data in the information storage medium 280 or the storage section 270. A case where the terminal device 20 receives a program and data, and operates based on the received program and data is also intended to be included within the scope of the invention.

The processing section 200 (processor) performs a game process, an image generation process, a sound generation process, and the like in cooperation with the server device 10 based on data input from the input section 260, a program, and the like. The game process includes a process that starts the game when game start conditions have been satisfied, a process that proceeds with the game, a process that places an object (e.g., player object and enemy object string), a process that displays the object, a process that calculates game results, a process that terminates the game when game termination conditions have been satisfied, and the like.

The processing section 200 performs various processes using the storage section 270 as a work area. The function of the processing section 200 may be implemented by hardware such as a processor (e.g., CPU or DSP) or an ASIC (e.g., gate array), or a program.

The processing section 200 includes an object space setting section 210, an operation detection processing section 211, a display control section 212, an input reception processing section 213, a game control section 214 (i.e., object control section or mode switch section), a game calculation section 215, a virtual camera control section 216, a game management section 217, a drawing section 220, and a sound processing section 230. Note that the processing section 200 may have a configuration in which some of these sections are omitted.

The object space setting section 210 places (sets) an object (i.e., an object formed by a primitive surface such as a sprite, a billboard, a polygon, a free-form surface, or a subdivision surface) that represents a display object (e.g., object (player object, moving object, and enemy object string (including an enemy character)), moving path, building, tree, pillar, wall, or map (geographical feature)) in an object space.

More specifically, the object space setting section 210 determines the position and the rotation angle (synonymous with orientation or direction) of an object (model object), and places the object at the determined position ((X, Y) or (X, Y, Z)) and the determined rotation angle (rotation angles around the X-axis and the Y-axis, or rotation angles around the X-axis, the Y-axis, and the Z-axis).

The term "object space" used herein includes a virtual two-dimensional space and a virtual three-dimensional space. The two-dimensional space is a space in which an object is placed at two-dimensional coordinates (X, Y), and the three-dimensional space is a space in which an object is placed at three-dimensional coordinates (X, Y, Z), for example.

When the object space is a two-dimensional space, the object space setting section 210 places a plurality of objects based on the priority set to each object. For example, the object space setting section 210 may perform a process that places a plurality of objects in order from an object (sprite) that is situated at the deepest position, and sequentially places an object so as to overlap the object that has been placed.

It is possible to generate an image in which an object space that corresponds to the upper side of the screen is placed at a deep position, and an object space that corresponds to the lower side of the screen is placed at a front position by placing an object having a large drawing size on the lower side of the image, and placing an object having a small drawing size on the upper side of the image.

When the object space is a three-dimensional space, the object space setting section 210 places each object in a world coordinate system.

The operation detection processing section 211 performs a process that determines input information that has been input by the player using the input section 260. More specifically, the operation detection processing section 211 receives an instruction with respect to each character that has been input by the player using the input section 260.

The display control section 212 displays contents with regard to the game (that is implemented based on an instruction input by the player) on the display section 290. For example, the display control section 212 displays a three-dimensional game space, a two-dimensional game space, or the like on the display section 290. The display control section 212 also displays various contents (e.g., game-related setting menu) on the display section 290 when the game starts, during the game, and when the game ends, for example.

The input reception processing section 213 receives an instruction that has been input by the player using the input section 260, and outputs the received instruction to the game control section 214 and the like.

The game control section 214 performs a game process based on a command received by the input reception processing section 213. For example, the game control section 214 performs a control process on a character (i.e., player character) that is operated based on the command (i.e., input instruction) received by the input reception processing section 213, or performs a control process on another character such as an enemy character. For example, when the game is a battle game or a shooting game, the game control section 214 performs a predetermined support process that attacks the enemy character, or recovers the power of the ally character. When the game is a simulation game, the game control section 214 performs a predetermined work process (e.g., crop production process or construction process). The game control section 214 also performs a movement calculation process that calculates the movement of a moving object (particularly a character object (e.g., player character and enemy character)) within the object space.

Specifically, the game control section 214 performs a process that moves the moving object within the object space, or controls the motion (animation) of the moving object, based on the data input by the player using the input section 260, a program (movement algorithm), data (motion data), and the like.

More specifically, the game control section 214 performs a simulation process that sequentially calculates movement information (moving direction, moving amount, moving speed, position, rotation angle, or acceleration) and motion information (position or rotation angle of each part object) about the object every frame. Note that the term "frame" used herein refers to a time unit used when implementing the object movement/motion process (simulation process) and the image generation process. The frame rate may be fixed, or may be changed corresponding to the processing load.

Note that the game control section 214 may perform a process that moves the object in a three-dimensional object space based on the input direction. For example, a moving direction is linked to each input direction in advance, and the game control section 214 moves the object in the moving direction that corresponds to the input direction.

The game control section 214 may perform the above process in cooperation with the server device 10, or may be partially or entirely implemented by the server device 10.

The game calculation section 215 performs various game calculation processes. For example, when a plurality of player characters used during the game are set as a deck based on instructions issued by the player, the game calculation section 215 performs a process that proceeds with the game using each player character set to the deck. The game calculation section 215 also performs a game calculation process necessary for forming a predetermined object space of a shooting game, forming an object space based on a map, proceeding with the game based on a scenario set in advance based on an operation performed by the player, causing the player object (operation target object) to battle with the enemy object or another object (non-operation target object), and managing a parameter during the battle, for example.

The game calculation section 215 manages a variable parameter corresponding to a slide operation input, and displays the result on the display section 290 in the form of a gauge in cooperation with the display control section 212.

The game calculation section 215 performs the above process in cooperation with the server device 10. Note that the game calculation section 215 may be partially or entirely implemented by the server device 10.

The virtual camera control section 216 generates an image that is viewed from a given viewpoint so as to have a depth. In this case, the virtual camera control section 216 performs a process that controls a virtual camera (viewpoint) for generating an image viewed from a given (arbitrary) viewpoint within the object space. More specifically, the virtual camera control section 216 performs a process that controls the position (X, Y, Z) or the rotation angle (rotational angles around X, Y, and Z axes) of the virtual camera (i.e., a process that controls the viewpoint position or the line-of-sight direction).

For example, when the object (e.g., character, ball, or car) is photographed from behind using the virtual camera, the virtual camera control section 216 controls the position or the rotation angle (orientation) of the virtual camera so that the virtual camera follows a change in the position or the rotation of the object.

In this case, the virtual camera control section 216 may control the virtual camera based on information about the position, the rotation angle, the speed, and the like with regard to the object obtained by the game control section 214. Alternatively, the virtual camera control section 216 may rotate the virtual camera by a predetermined rotation angle, or may move the virtual camera along a predetermined path. In this case, the virtual camera control section 216 controls the virtual camera based on virtual camera data that represents the position (moving path) or the rotation angle of the virtual camera.

When a plurality of virtual cameras (viewpoints) are provided, the virtual camera control section 216 performs the above control process on each virtual camera.

The game management section 217 sets the player character and various items used by each player during the game (e.g., battle game) based on the operation input by the player using the input section 260, and registers the player character and the items in the user information 273. When the game is implemented using a deck, for example, the game management section 217 registers the player character and the items in the user information 273 as deck data.

The drawing section 220 performs a drawing process based on the results of various processes (game process) performed by the processing section 200 to generate an image, and outputs the generated image to the display section 290. The drawing section 220 may generate a two-dimensional image, or may generate a three-dimensional image. The drawing section 220 generates an image that is viewed from the virtual camera within the object space, and is displayed within the screen.

When the drawing section 220 generates a two-dimensional image, the drawing section 220 draws each object in order from an object with the lowest priority, and draws an object with a higher priority over the object that has been drawn when an overlap occurs.

When the drawing section 220 generates a three-dimensional game image, the drawing section 220 receives object data (model data) including vertex data (e.g., vertex position coordinates, texture coordinates, color data, normal vector, or alpha-value) that represents each vertex of the object (model), and performs a vertex process based on the vertex data included in the input object data. The drawing section 220 may optionally perform a vertex generation process (tessellation, curved surface division, or polygon division) for subdividing the polygon when performing the vertex process.

When the drawing section 220 performs the vertex process, the drawing section 220 performs a vertex movement process and a geometric process (e.g., coordinate transformation (world coordinate transformation or camera coordinate transformation), clipping, perspective transformation, or light source process), and changes (updates or adjusts) the vertex data that represents each vertex that forms the object based on the processing results. The drawing section 220 performs a rasterization process (scan conversion process) based on the vertex data subjected to the vertex process to link the surface of the polygon (primitive) to pixels. The drawing section 220 then performs a pixel process (fragment process) that draws the pixels that form the image (fragments that form the display screen).

When the drawing section 220 performs the pixel process, the drawing section 220 determines the final drawing color of each pixel by performing a texture reading (texture mapping) process, a color data setting/change process, a translucent blending process, an anti-aliasing process, and the like, and outputs (draws) the drawing color of the object subjected to perspective transformation to the image buffer 272 (i.e., a frame buffer or a buffer that can store image information on a pixel basis (VRAM or rendering target)). Specifically, the pixel process includes a per-pixel process that sets or changes the image information (e.g., color, normal, luminance, and alpha-value) on a pixel basis.

The drawing section 220 thus generates an image that is viewed from the virtual camera (given viewpoint) set within the object space. When a plurality of virtual cameras (viewpoints) are provided, the drawing section 220 may generate an image so that images (segmented images) viewed from the respective virtual cameras are displayed within one screen.

The vertex process and the pixel process performed by the drawing section 220 may be implemented by hardware that enables a programmable polygon (primitive) drawing process (i.e., programmable shader (vertex shader or pixel shader)) according to a shader program written in shading language. The programmable shader enables a programmable per-vertex process and per-pixel process, increases the degree of freedom with respect to the drawing process, and significantly improves the representation capability as compared with a fixed hardware drawing process.

The drawing section 220 performs a geometric process, a texture mapping process, a hidden surface removal process, an alpha-blending process, and the like when drawing the object.

The geometric process includes subjecting the object to a coordinate transformation process, a clipping process, a perspective projection transformation process, a light source calculation process, and the like. The drawing section 220 stores the object data (e.g., object's vertex position coordinates, texture coordinates, color data (luminance data), normal vector, or alpha-value) after the geometric process (after perspective transformation) in the storage section 270.

The texture mapping process includes a process that maps a texture (texel value) stored in a texture storage section included in the storage section 270 onto the object. Specifically, the drawing section 220 reads a texture (surface properties such as color (RGB) and alpha-value) from the texture storage section included in the storage section 270 using the texture coordinates set (assigned) to each vertex of the object and the like, and maps the texture (two-dimensional image) onto the object. In this case, the drawing section 220 performs a pixel-texel link process, a bilinear interpolation process (texel interpolation process), and the like.

Note that the game system 1 may perform a process that maps a given texture when drawing the object. In this case, it is possible to dynamically change the color distribution (texel pattern) of the texture to be mapped onto the object.

In such a case, a texture that has a different color distribution (pixel pattern) may be dynamically generated, or a plurality of textures that differ in color distribution may be provided in advance, and dynamically selected. The color distribution of the texture may be changed on an object basis.

The drawing section 220 performs the hidden surface removal process using a Z-buffer method (depth comparison method or Z-test) that utilizes a Z-buffer (depth buffer) that stores the Z-value (depth information) of the drawing target pixel. More specifically, the drawing section 220 refers to the Z-value stored in the Z-buffer when drawing the drawing target pixel that corresponds to the primitive of the object, and compares the Z-value stored in the Z-buffer with the Z-value of the drawing pixel of the primitive. When the Z-value of the drawing pixel is a Z-value (e.g., small Z-value) that indicates a position on the front side when viewed from the virtual camera, the drawing section 220 draws the drawing target pixel, and updates the Z-value stored in the Z-buffer with a new Z value.

When the drawing section 220 performs the alpha-blending process, the drawing section 220 performs a translucent blending process (e.g., normal alpha-blending, additive alpha-blending, or subtractive alpha-blending) based on the alpha-value (A-value). Note that the alpha-value is information that can be stored so as to be linked to each pixel (texel or dot), such as additional information other than the color information. The alpha-value can be used as mask information, translucency (equivalent to transparency or opacity), bump information, and the like.

The sound processing section 230 performs a sound process based on the results of various processes performed by the processing section 200 to generate a game sound (e.g., background music (BGM), effect sound, or voice), and outputs the generated game sound to the sound output section 292.

Note that the terminal device included in the game system 1 may implement a system dedicated to a single-player mode that allows only one player to play the game, or may implement a system that can also implement a multi-player mode that allows a plurality of players to play the game.

When a plurality of players play the game, the game image and the game sound provided to the plurality of players may be generated using one terminal device 20, or may be generated by a distributed process using a plurality of terminal devices 20 or the server device 10 connected through a network (transmission line or communication line) or the like.

4. Method 4-1. Game Process 4-1-1. Outline of Game Process

The processing section 200 included in the terminal device 20 according to one embodiment of the invention performs the game process described below.

Specifically, the processing section 200 causes an enemy character and a player character that appear within a screen used for the game (hereinafter referred to as "game screen") to play tag, notifies the player that the game screen has been cleared when the player character has satisfied the clear condition described later, and notifies the player that the player has made a mistake, and terminates the game process when the player character falls under the mistake condition described later. The game process can implement a mode in which a single player plays the game, and a mode in which a plurality of players play the game. An example in which the game process implements a mode (single-player mode) in which a single player plays the game is described below.

4-1-2. Game Screen

Figure 4:
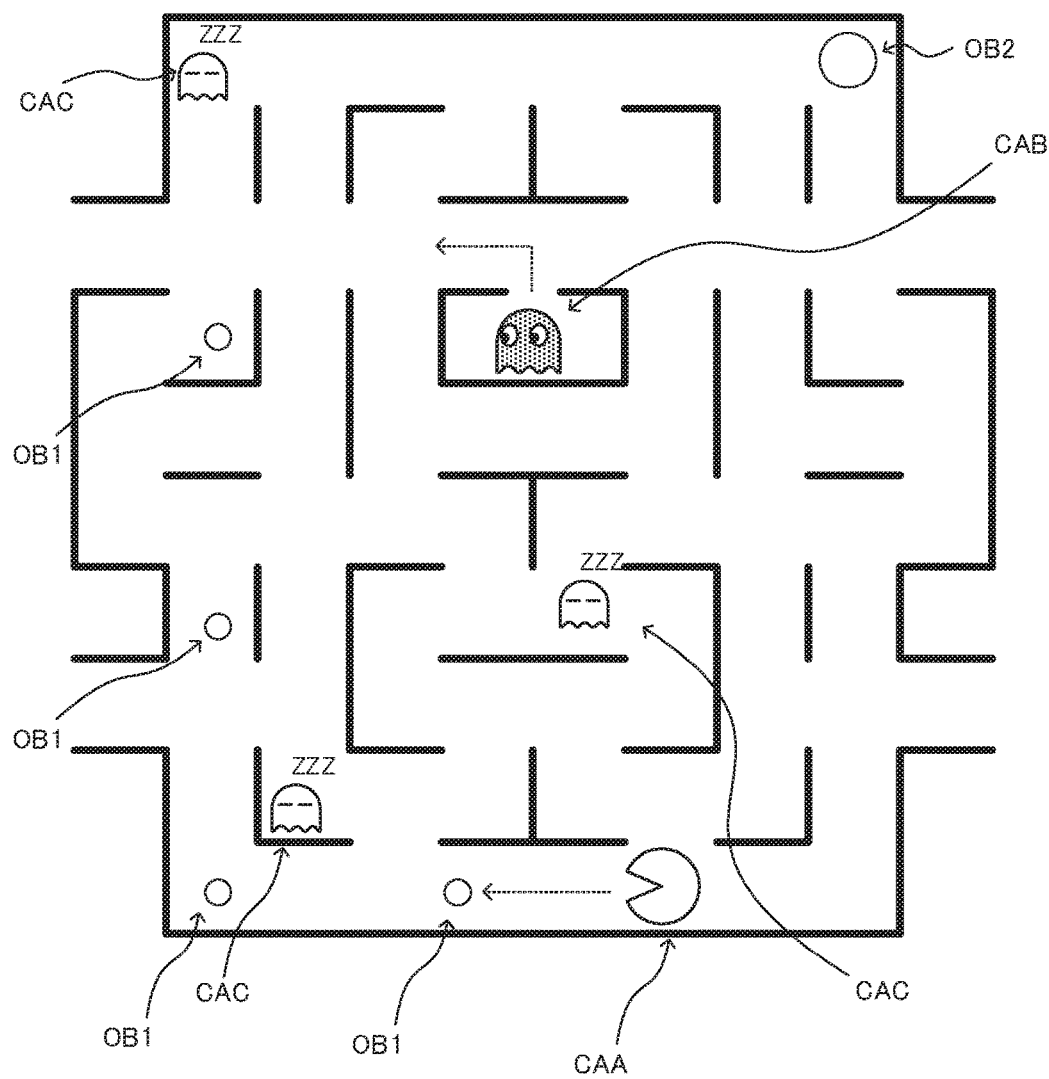
FIG. 4 is an example of a diagram illustrating a sub-character in a normal mode.

The display control section 212 included in the processing section 200 places virtual walls that limit the moving direction of each character within the game screen (see FIG. 4, for example). A plurality of thick lines illustrated in FIG. 4 represent the virtual walls. Note that this process may be performed by the display control section 212 either alone or in cooperation with the game control section 214 (hereinafter the same). The virtual walls thus form a maze-like path (game map) within the game screen. The display control section 212 places a plurality of predetermined objects OB1 at a plurality of positions within the path, and places a special object OB2 at a predetermined position within the path. Note that the display control section 212 may place the special object OB2 when the game screen is displayed, or may place the special object OB2 when a player character CAA has satisfied a predetermined condition (appearance condition).

The display control section 212 places a main enemy character CAB (hereinafter referred to as "main character CAB") (i.e., main object), one or more sub-enemy characters CAC (hereinafter referred to as "sub-characters CAC") (i.e., sub-objects) connected in series to the main character CAB, and the player character CAA that can be operated by the player, within the path that is formed within the game screen (see FIG. 7, for example). A string that includes the main character CAB and one or more sub-characters CAC connected in series to the main character CAB is hereinafter referred to as "enemy character string T" (i.e., object string), and the main character CAB and the sub-character(s) CAC are hereinafter collectively referred to as "enemy characters". The motion of the player character CAA and the motion of the enemy character string T are controlled by the game control section 124.

When the player character CAA has touched an object OB1 among the plurality of objects OB1, the display control section 212 deletes the object OB1 that has been touched by the player character CAA from the game screen. When the player character CAA has touched the special object OB2, the display control section 212 deletes the special object OB2 that has been touched by the player character CAA from the game screen. The objects OB1 and OB2 are thus deleted as if they were eaten by the player character CAA. Although an example in which an object is deleted when the object has been touched by the player character CAA has been described above, an object may be deleted when the player character CAA has approached the object, or when the player character CAA has touched or approached the object. Note that the expression "touched" used hereinafter can be appropriately replaced by the expression "touched or approached". The expression "touched or approached" means that the distance (interval) between an object and the player character CAA has become equal to or less than a predetermined threshold value, and the expression "touched" means that the distance (interval) between an object and the player character CAA has become "0".

4-1-3. Basic Enemy Character Motion Control Process

The game control section 214 (i.e., object control section) included in the processing section 200 controls the motion of the main character CAB and the motion of the sub-character CAC within the game screen according to a predetermined algorithm. The game control section 214 basically moves the main character CAB and the sub-character(s) CAC included in the enemy character string T within the game screen so as to imitate the motion of a snake in a state in which the main character CAB and the sub-character(s) CAC are connected in series (see FIG. 7). Therefore, the ratio in which the path is occupied by the enemy character string T increases, and the degree of freedom with respect to the movement of the player character CAA decreases as the number of sub-characters CAC included in the enemy character string T increases.

The game control section 214 (i.e., mode switch section) included in the processing section 200 switches the motion mode of the enemy characters between a normal mode (i.e., first mode), an inferior mode (i.e., second mode), and a superior mode (i.e., third mode) at an appropriate timing.

Each mode is briefly described below. The normal mode, the inferior mode, and the superior mode differ from each other as to the power of the enemy characters with respect to the player character. The power of the enemy characters is set to be highest in the superior mode, is set to be next highest in the normal mode, and is set to be lowest in the inferior mode. The term "power" used herein in connection with the enemy characters refers to the possibility that the enemy characters induce the player to make a mistake (i.e., cause the player character CAA to disappear (to be deleted)), and can be set using at least one of the parameters (a), (c), (c), and (d) listed below, for example.

(a) Moving Speed of Enemy Characters

The moving speed of the enemy characters refers to the speed at which the enemy characters move within the path that is formed within the game screen.

(b) Attack Capability of Enemy Characters

The attack capability of the enemy characters refers to the capability of the enemy characters to cause the player character CAA to disappear from the game screen as a result of touching the player character CAA.

(c) Movement Type of Enemy Characters

The movement type of the enemy characters refers to the type of movement algorithm. Examples of the type of movement algorithm include an escape type that causes the enemy characters to move away from the player character CAA, a chase type that causes the enemy characters to move so as to approach the player character CAA, a random type that causes the enemy characters to move randomly, a type that causes the enemy characters to maintain a predetermined positional relationship with the player character CAA, and the like.

(d) Disappearance Possibility of Enemy Characters

The disappearance possibility of the enemy characters refers to the possibility that the enemy characters disappear from the game screen as a result of touching the player character CAA.

4-1-4. Power Setting in Each Mode

The game control section 124 sets the power of the enemy characters in each of the normal mode, the inferior mode, and the superior mode as described below. Note that the power of the enemy characters need not necessarily be set as described below. The power of the enemy characters may be set in a modified way as long as the normal mode, the inferior mode, and the superior mode maintain the relationship with respect to power.

(A) Normal mode: The moving speed of the main character CAB and the sub-character(s) CAC is set to a predetermined speed (hereinafter referred to as "normal speed"). The attack capability of the main character CAB and the sub-character(s) CAC is set to "NO". The movement type of the main character CAB and the sub-character(s) CAC is set to "random type", for example. The disappearance possibility of the main character CAB and the sub-character(s) CAC is set to "NO". Note that the moving speed of the main character CAB and the sub-character(s) CAC in the normal mode is the same as the moving speed of the player character CAA, for example. The normal mode (A) may be referred to as "standby mode" since the enemy characters cannot attack the player character, and the player character cannot attack the enemy characters.

(B) Inferior mode: The moving speed of the main character CAB and the sub-character(s) CAC is set to a speed (hereinafter referred to as "high speed") higher than the normal speed. The attack capability of the main character CAB and the sub-character(s) CAC is set to "NO". The movement type of the main character CAB and the sub-character(s) CAC is set to "escape type". The disappearance possibility of the main character CAB and the sub-character(s) CAC is set to "YES". Note that the moving speed of the main character CAB and the sub-character(s) CAC in the inferior mode is higher than the moving speed of the player character CAA, for example. The normal mode (B) may be referred to as "attacked mode" since the enemy characters cannot attack the player character, and the player character can attack the enemy characters.

(C) Superior mode: The moving speed of the main character CAB and the sub-character(s) CAC is set to the normal speed, for example. The attack capability of the main character CAB is set to "YES", and the attack capability of the sub-character(s) CAC is set to "NO". The movement type of the main character CAB and the sub-character(s) CAC is set to "chase type". The disappearance possibility of the main character CAB and the sub-character(s) CAC is set to "NO". Note that the moving speed of the main character CAB and the sub-character(s) CAC in the superior mode may be higher than the moving speed of the player character CAA, but is set to be the same as the moving speed of the player character CAA, for example. The superior mode (C) may be referred to as "attack mode" since the enemy characters can attack the player character, and the player character cannot attack the enemy characters.

Accordingly, the player desires to prevent a situation in which the enemy characters are set to the superior mode (C), and promptly bring about a situation in which the enemy characters are set to the inferior mode (B).

Note that the details of the motion of the enemy characters in the normal mode, the inferior mode, and the superior mode, and the condition (mode switch condition) that should be satisfied by the player character CAA in order to switch the mode, are described later.

4-1-5. Player Character Motion Control Process

The game control section 214 included in the processing section 200 controls the motion of the player character CAA within the game screen according to an instruction (command) input by the player. More specifically, the game control section 214 maintains the moving speed of the player character CAA within the game screen at a predetermined speed, and changes the moving direction of the player character CAA within the game screen according to a command input by the player.

The player inputs a command using the input section 260. The player basically inputs a command that designates the moving direction of the player character CAA. Examples of the command include a command (UP command) that designates the upward direction with respect to the game screen, a command (DOWN command) that designates the downward direction with respect to the game screen, a command (RIGHT command) that designates the rightward direction with respect to the game screen, and a command (LEFT command) that designates the leftward direction with respect to the game screen.

When the UP command has been input by the player, the game control section 214 included in the processing section 200 sets the moving direction of the player character CAA to be the upward direction with respect to the game screen. When the DOWN command has been input by the player, the game control section 214 sets the moving direction of the player character CAA to be the downward direction with respect to the game screen. When the RIGHT command has been input by the player, the game control section 214 sets the moving direction of the player character CAA to be the rightward direction with respect to the game screen. When the LEFT command has been input by the player, the game control section 214 sets the moving direction of the player character CAA to be the leftward direction with respect to the game screen. Therefore, the player can control the position of the player character CAA at each timing by merely inputting the desired command using the input section 260.

Since only the above four commands are basically necessary for the game process performed by the game system 1, a simple device (e.g., arrow key, joystick, keyboard, lever, steering wheel, or virtual controller) or the like can be used as the input section 260. For example, when a touch panel is used as the input section 260, it may be determined that the UP command has been input when an upward swipe operation has been performed on the touch panel, it may be determined that the DOWN command has been input when a downward swipe operation has been performed on the touch panel, it may be determined that the RIGHT command has been input when a rightward swipe operation has been performed on the touch panel, and it may be determined that the LEFT command has been input when a leftward swipe operation has been performed on the touch panel.

4-1-6. Clear Condition

The game control section 214 included in the processing section 200 determines that the game screen has been cleared when the player character CAA has deleted all of the objects OB1 from the game screen. The game control section 214 notifies the player that the game screen has been cleared when the game screen has been cleared. The game management section 217 adds points to the score of the player that is included in the user information 273, or allows the player to play the game using a new game screen, or provides a bonus to the player. Note that this process may be performed by the game management section 217 either alone or in cooperation with the game control section 214 (hereinafter the same).

The game control section 214 may notify the player that the game screen has been cleared by causing the display section 290 to display an appropriate image, or may notify the player that the game screen has been cleared by causing the sound output section 292 to output an appropriate sound, or may notify the player that the game screen has been cleared by causing the display section 290 to display an appropriate image, and causing the sound output section 292 to output an appropriate sound. Note that the game control section 214 causes the display section 290 to display an appropriate image through the display control section 212, and causes the sound output section 292 to output an appropriate sound through the sound processing section 230 (hereinafter the same).

4-1-7. Mistake Condition

The game control section 214 included in the processing section 200 determines that the player has made a mistake, and notifies the player that the player has made a mistake when the enemy characters have been set to the superior mode described later, and the main character CAB and the player character CAA have satisfied a predetermined positional relationship condition.

The predetermined positional relationship condition is satisfied when the distance (interval) between the main character CAB and the player character CAA has become equal to or less than a predetermined threshold value, or when the distance (interval) between the main character CAB and the player character CAA has been maintained to be less than the threshold value for a predetermined time, or when the player character CAA has touched the enemy character string T one or more times, for example. An example in which it is determined that the predetermined positional relationship condition has been satisfied when the player character CAA has touched the enemy character string T one or more times, is described below.

Examples of the case where the player has made a mistake include a case where the player character CAA has been damaged, a case where the score of the player has been decreased (or the score of the player has been degraded), a case where the player character CAA has disappeared from the game screen (i.e., the number of player characters CAA that can be used by the player within the game screen has decreased by 1), and the like. An example in which it is determined that the player has made a mistake when the player character CAA has disappeared from the game screen (i.e., the number of player characters CAA that can be used by the player within the game screen has decreased by 1), is described below.

The game control section 214 may notify the player that the player has made a mistake by causing the display section 290 to display an appropriate image, or may notify the player that the player has made a mistake by causing the sound output section 292 to output an appropriate sound, or may notify the player that the player has made a mistake by causing the display section 290 to display an appropriate image, and causing the sound output section 292 to output an appropriate sound. Note that the game control section 214 causes the display section 290 to display an appropriate image through the display control section 212, and causes the sound output section 292 to output an appropriate sound through the sound processing section 230 (hereinafter the same).

4-2. Character Motion Control Process in Normal Mode

When the game screen is displayed, the display control section 212 places the main character CAB and one or more sub-characters CAC that are included in the enemy character string T at a plurality of positions within the game screen in a state in which the main character CAB and the one or more sub-characters CAC are not connected to each other (i.e., the main character CAB and the one or more sub-characters CAC are separated from each other) (see FIG. 4).

When the game screen has been displayed, the game control section 214 moves the main character CAB at the normal speed, and sets the movement type of the enemy character string T in the normal mode to "random type", for example.

When the game screen has been displayed, the game control section 214 maintains the one or more sub-characters CAC in a stationary state. The sub-character(s) CAC set to a stationary state is a candidate for a sub-character that is connected to the main character CAB that is being moved. FIG. 4 illustrates an example in which the sub-characters CAC set to a stationary state wear an asleep expression, and a text "ZZZ" that represents an asleep state is displayed near each sub-character CAC set to a stationary state.

Figure 5:
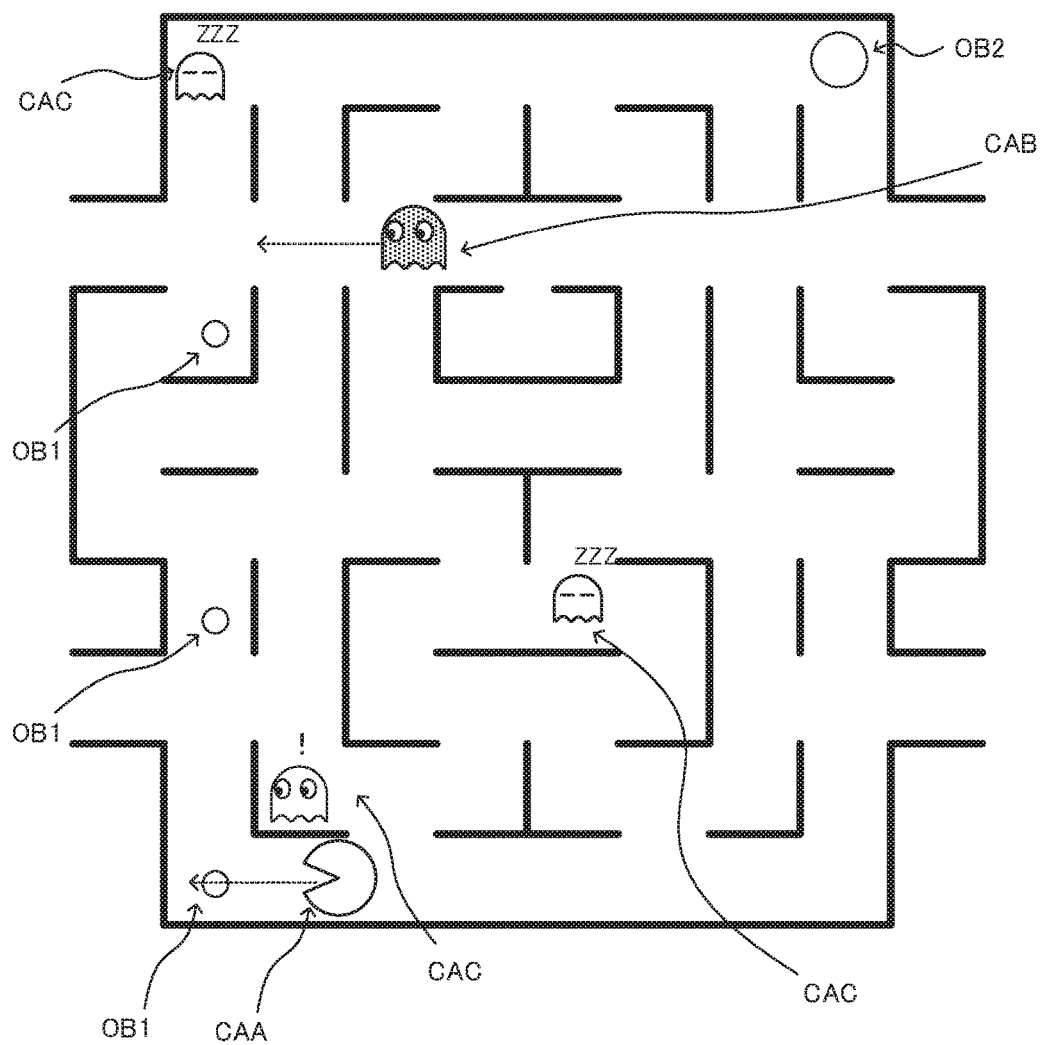
FIG. 5 is an example of a diagram illustrating a change in a sub-character in a normal mode.
Figure 6:
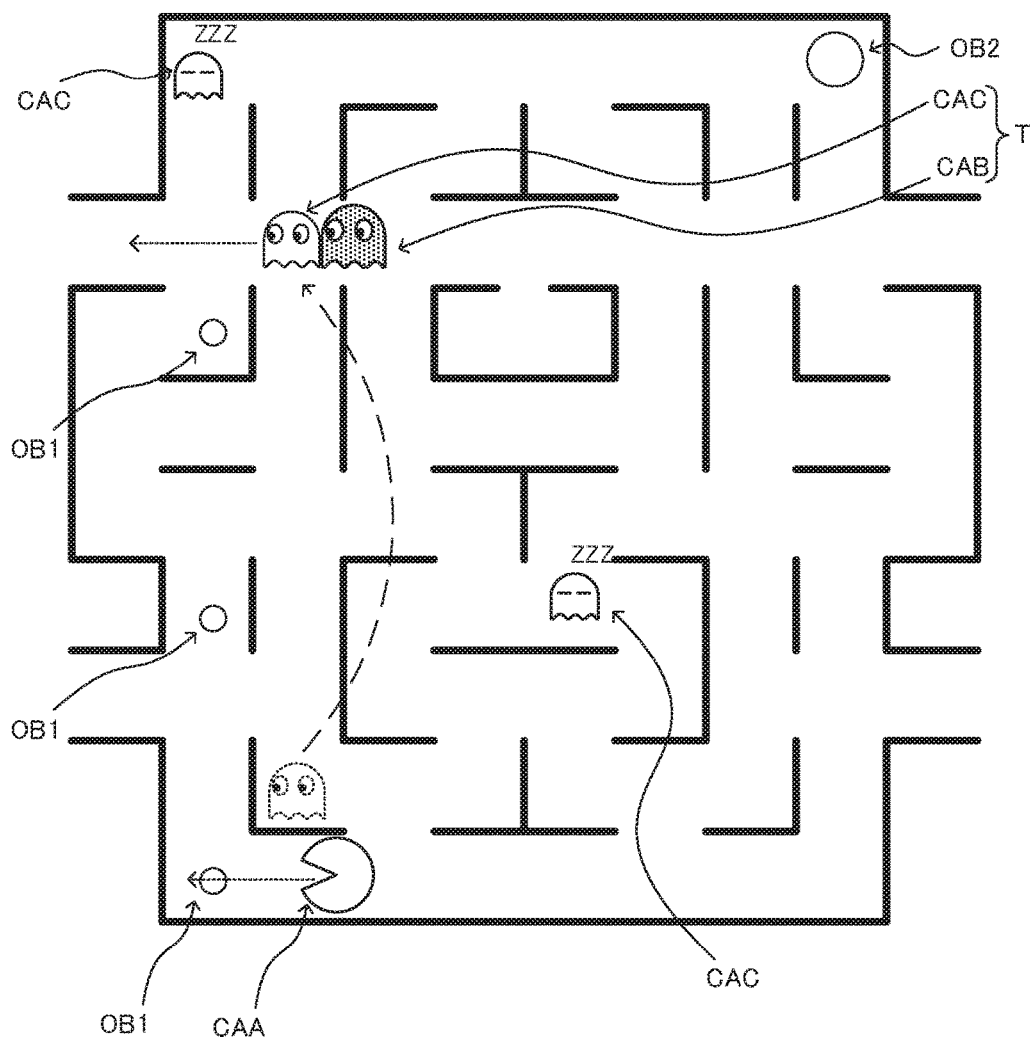
FIG. 6 is an example of a diagram illustrating a state in which a sub-character is connected to a main character in a normal mode.

As illustrated in FIG. 5 (see the lower left), when the player character CAA has approached the sub-character CAC set to a stationary state, the display control section 212 causes the sub-character CAC to wear a waking expression, and the game control section 214 connects the sub-character CAC to the main character CAB that is being moved (see FIG. 6 (see the upper left)).

The game control section 214 moves the sub-character CAC connected to the main character CAB together with the main character CAB. The main character CAB and the sub-character CAC that are thus moved in a connected state form the enemy character string T. In FIG. 6, the moving direction of the enemy character string T is indicated by a dotted arrow (hereinafter the same).

The expression "A has approached B" used herein means that the distance between A and B has become equal to or less than a threshold value. For example, the game control section 214 sets a circular area having a predetermined radius around the player character CAA that is being moved. When the contour of the circular area has touched a sub-character CAC, the game control section 214 determines that the main character CAB has approached the sub-character CAC. The display control section 212 causes the sub-character CAC to wear a waking expression, and the game control section 214 connects the sub-character CAC to the main character CAB that is being moved. When another sub-character CAC has been connected to the main character CAB, the game control section 214 connects the sub-character CAC to the head of the enemy character string T.

Specifically, when the player character CAA has approached a sub-character CAC set to a stationary state, the number of sub-characters CAC included in the enemy character string T (i.e., the number of connected sub-characters CAC) increases. FIG. 7 (see the lower part) illustrates an enemy character string T in which three sub-characters CAC are connected. According to the above configuration, the player can intentionally increase the number of sub-characters included in the enemy character string T that is being moved.

Figure 7:
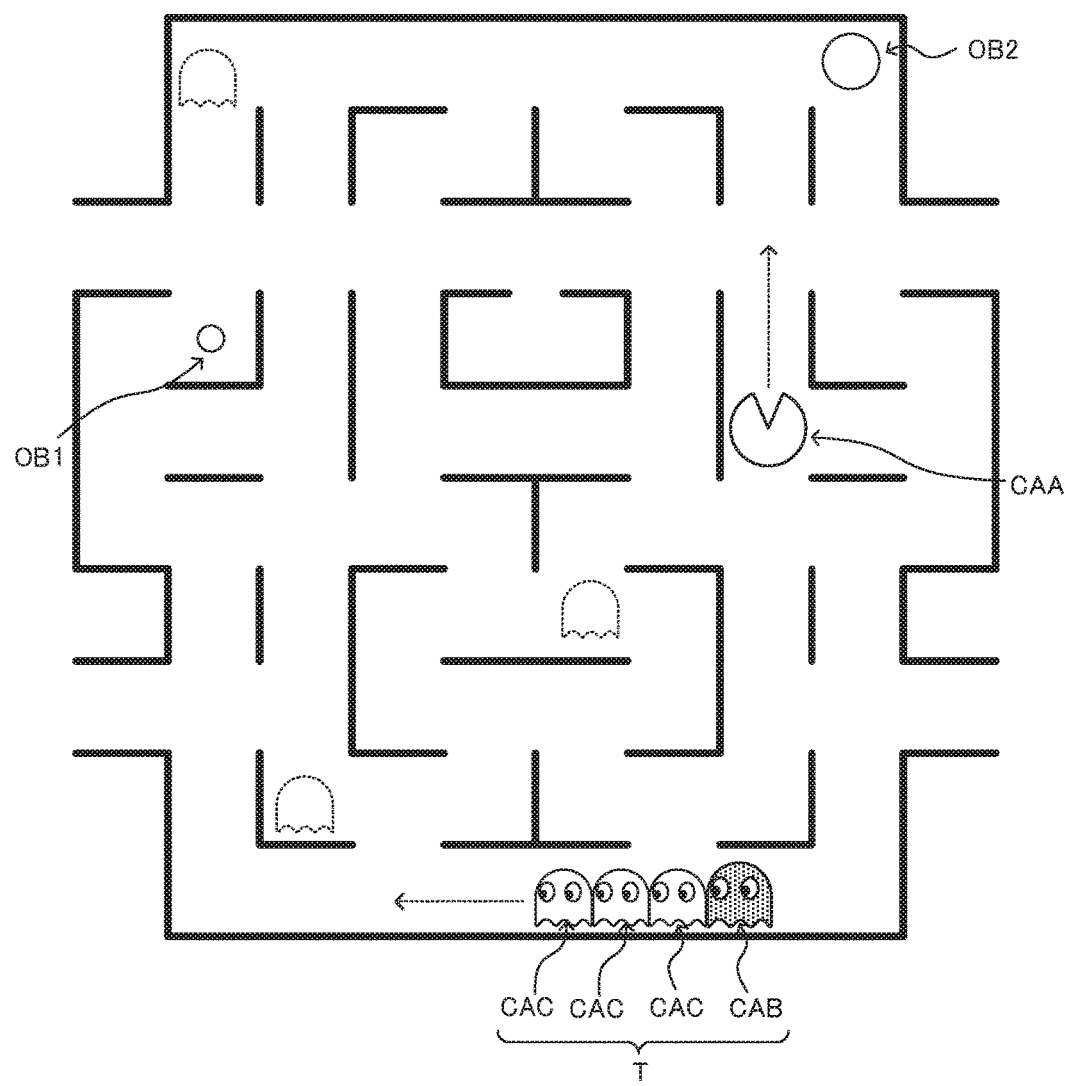
FIG. 7 is an example of a diagram illustrating the motion of an enemy character string in a normal mode.

Since the enemy character string T is moved in the normal mode so that the sub-character CAC leads the enemy character string T (see FIG. 7 (see the lower part)), the main character CAB is moved as if the main character CAB were using the sub-character(s) CAC as a shield. Therefore, the player is given an impression that the main character CAB is cowardly.

Although an example in which the display control section 212 causes a sub-character CAC (set to a stationary state) that the player character CAA has approached to wear a waking expression, has been described above, the display control section 212 may cause a sub-character CAC (set to a stationary state) that has been touched by the player character CAA to wear a waking expression, or may cause a sub-character CAC (set to a stationary state) for which the elapsed time from the appearance has reached a threshold value, to wear a waking expression.

4-3. Mode Switch Condition Whereby Mode is Switched from Normal Mode to Inferior Mode The game control section 214 sets deletion of the object OB2 to be the mode switch condition whereby the mode is switched from the normal mode to the inferior mode.

Figure 8:
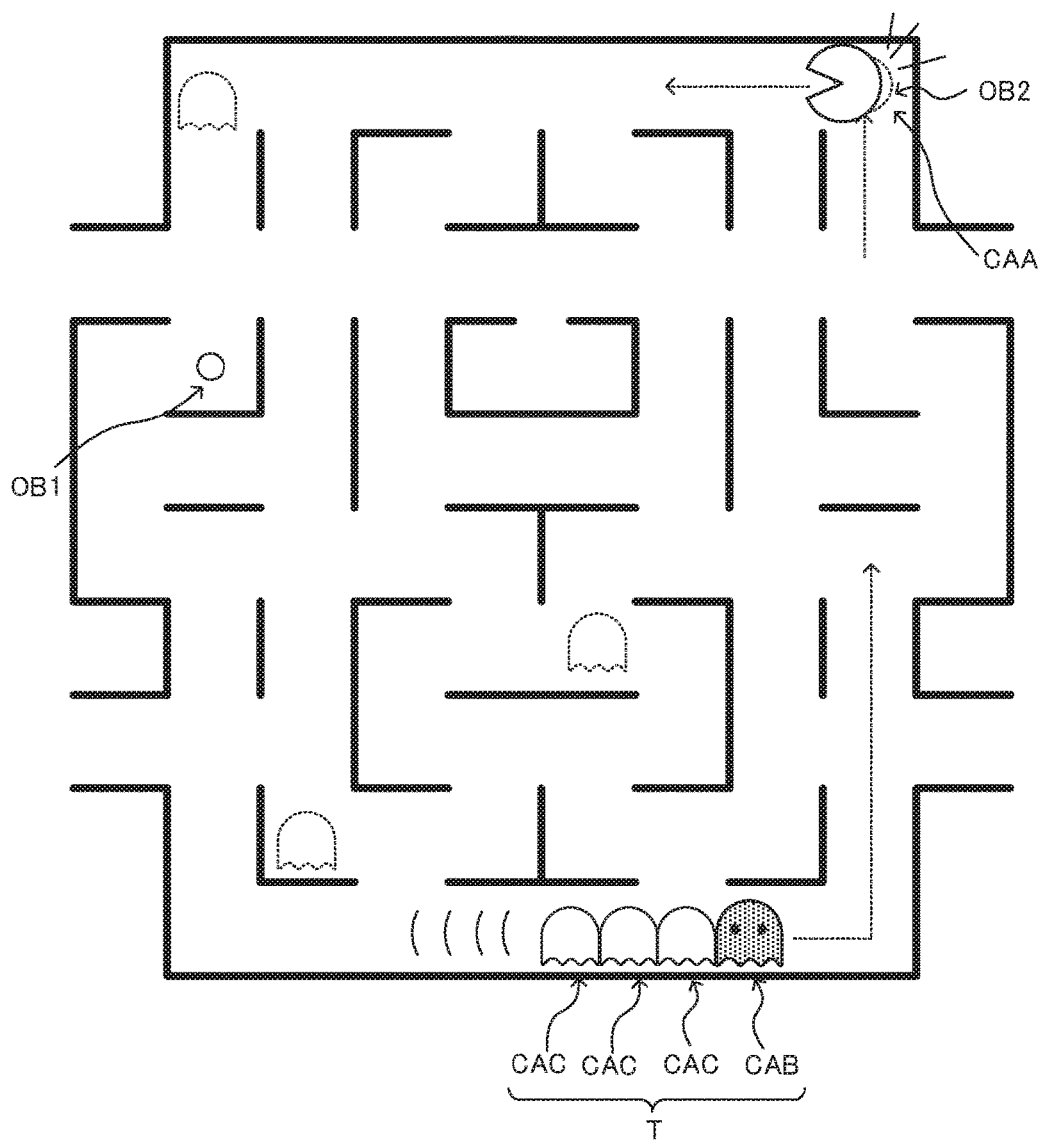
FIG. 8 is an example of a diagram illustrating a condition whereby the mode is switched to an inferior mode.

Specifically, when the player character CAA has deleted the special object OB2 in a state in which the enemy character string T has been set to the normal mode (see FIG. 8), the game control section 214 sets the motion mode of the enemy character string T to the inferior mode. FIG. 8 (see the lower right) illustrates the enemy character string T immediately after being set to the inferior mode.

When the motion mode of the enemy character string T has been changed from the normal mode to the inferior mode, the display control section 212 changes the expressions of the main character CAB and the sub-character(s) CAC included in the enemy character string T as illustrated in FIG. 8, for example. FIG. 8 illustrates an example in which the main character CAB and the sub-characters CAC wear no expression in the inferior mode. Note that at least either the main character CAB or the sub-character(s) CAC may be caused to wear an embarrassed expression, a sad expression, or the like in the inferior mode.

4-4. Character Motion Control Process in Inferior Mode

When the enemy character string T has been set to the inferior mode, the game control section 214 sets the moving direction of the enemy character string T so that the main character CAB leads the enemy character string T (see FIG. 8).

When the enemy character string T has been set to the inferior mode, the game control section 214 sets the moving speed of the enemy character string T to the high speed, and sets the movement type of the enemy character string T to "escape type".

In this case, the enemy character string T escapes from the player character CAA at the high speed immediately after being set to the inferior mode from the normal mode so that the main character CAB leads the enemy character string T.

Specifically, the enemy character string T moves as if the main character CAB were leading the escape. Therefore, the player is given an impression that the main character CAB is selfish in the inferior mode.

Figure 9:
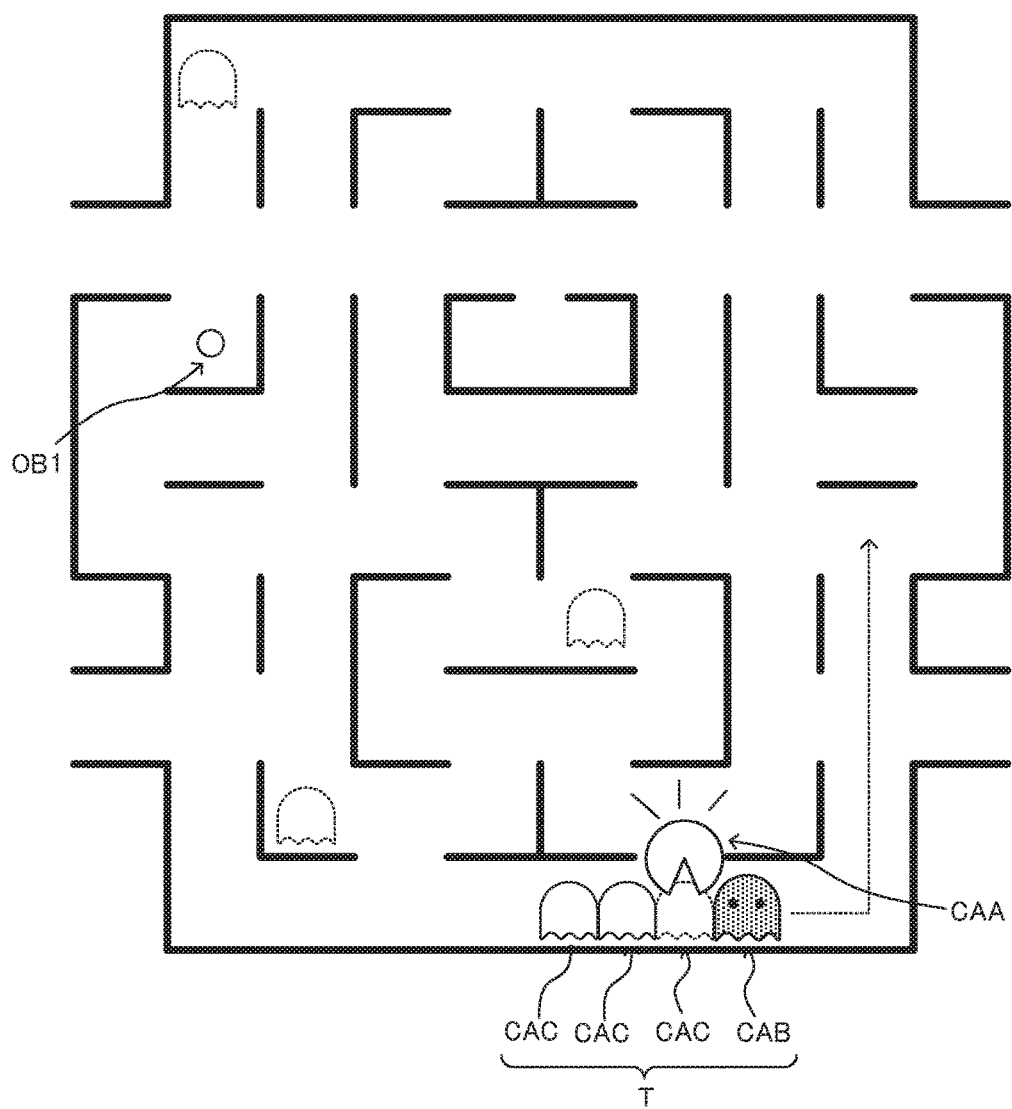
FIG. 9 is an example of a diagram illustrating the motion of a player character and the motion of an enemy character string in an inferior mode.

The moving speed of the enemy character string T in the inferior mode is higher than the moving speed of the player character CAA. Therefore, the player character CAA basically cannot approach the enemy character string T that moves along a linear path so as to reach the rear of the enemy character string T, but can approach the enemy character string T sideways by utilizing a bypath (see FIG. 9).

When the player character CAA has touched a sub-character CAC among the sub-characters CAC included in the enemy character string T, the display control section 212 deletes the sub-character CAC that has been touched by the player character CAA from the game screen so that the number of characters included (connected) in the enemy character string T decreases. The total length of the enemy character string T decreases due to the deletion of the sub-character CAC. In this case, the sub-character CAC is deleted as if the sub-character CAC were eaten by the player character CAA.

When the sub-character CAC has been deleted, the game control section 214 adds a value that corresponds to the number of deleted sub-characters CAC to the score of the player. The game management section 217 upgrades the score of the player as the number of sub-characters CAC that have been successively deleted increases.

Specifically, the player can decrease the total length of the enemy character string T and acquire points by causing the player character CAA to touch the sub-character CAC included in the enemy character string T, and upgrade the score by successively deleting the enemy characters (sub-characters CAC and main character CAB) included in the enemy character string T.

Figure 10:
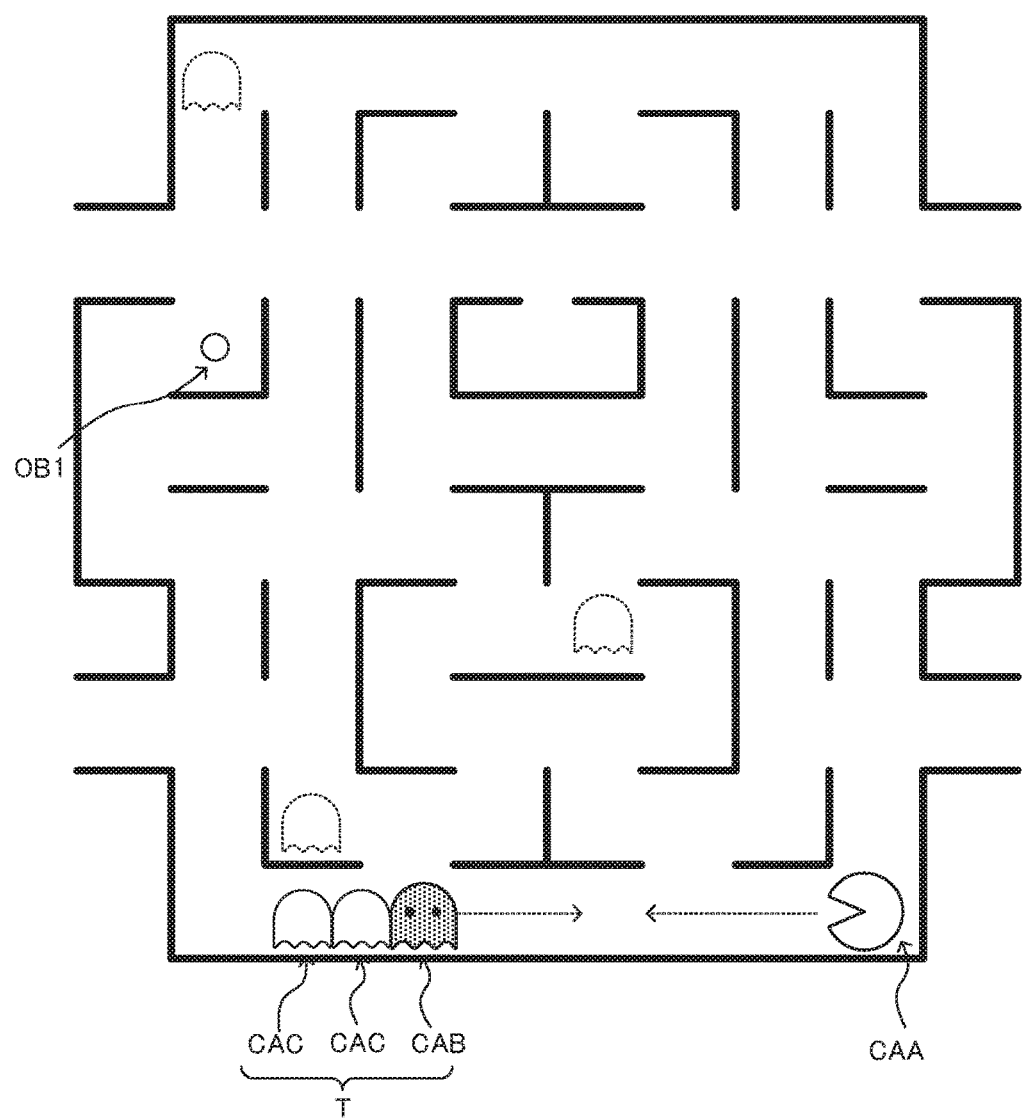
FIG. 10 is an example of a diagram illustrating a situation in which a player character attacks the head of an enemy character string.
Figure 11:
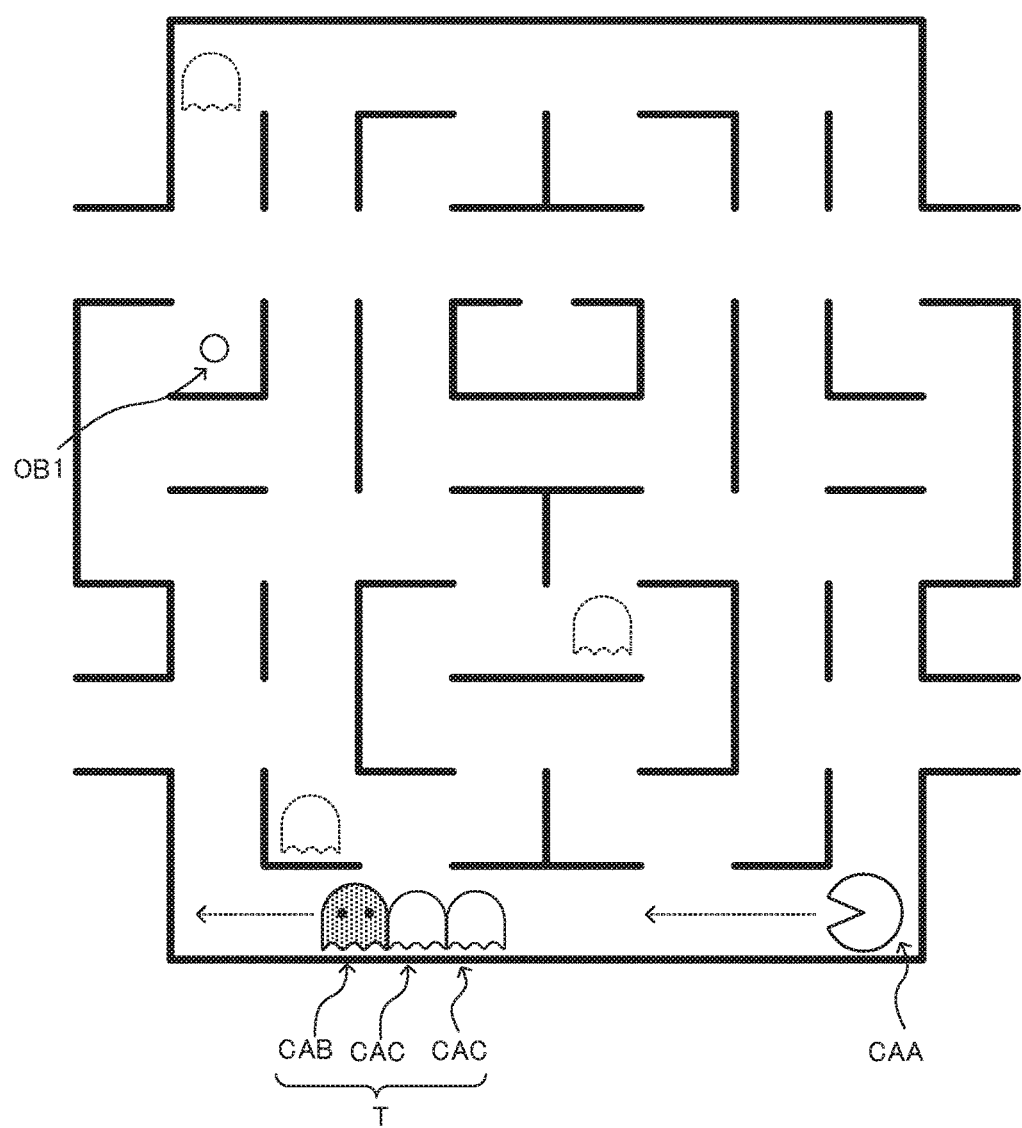
FIG. 11 is an example of a diagram illustrating a situation in which a player character attacks the rear of an enemy character string.

As illustrated in FIG. 10, when the player character CAA lies in wait for the enemy character string T on the front side of the enemy character string T (i.e., when the player character CAA has approached the enemy character string T from the front side), for example, all of the enemy characters (sub-characters CAC and main character CAB) included in the enemy character string T are successively deleted in order from the main character CAB. Therefore, the player can acquire higher points as compared with the case where the same number of enemy characters (sub-characters CAC and main character CAB) are not deleted successively.

When the number of characters included in the enemy character string T has decreased, the game control section 214 decreases the moving speed of the enemy character string T by the number of characters that have been deleted.

This makes it possible to provide a trade-off relationship in which, as the number of sub-characters CAC included in the enemy character string T increases, it becomes more difficult for the player to cause the player character CAA to chase the enemy character string T since the enemy character string T moves at a higher speed, but it is likely that the player can acquire higher points since a larger number of enemy characters can be successively deleted.

4-5. Mode Switch Condition Whereby Mode is Switched from Inferior Mode to Normal Mode When a predetermined time (e.g., 4 seconds) has elapsed after the enemy characters have been set to the inferior mode, the game control section 214 sets the motion mode of the enemy character string T to the normal mode. Specifically, the game control section 214 sets a limit to the time in which the enemy characters are set to the inferior mode (i.e., the time in which the player can attack the enemy characters). It is considered that the player is psychologically affected in an advantageous way by setting a time limit, and it is possible to bring a feeling of tension in the inferior mode, since a human normally cannot maintain a tense state for a long time.

4-6. Mode Switch Condition Whereby Mode is Switched from Normal Mode to Superior Mode The game control section 214 may set a condition whereby the distance between the player character CAA and an arbitrary part of the enemy character string T has become less than a predetermined threshold value, a condition whereby the distance between the player character CAA and an arbitrary part of the enemy character string T has been maintained to be less than the threshold value for a predetermined time, or a condition whereby the player character CAA has touched an arbitrary part of the enemy character string T one or more times, to be the mode switch condition whereby the mode is switched from the normal mode to the superior mode, for example. An example in which a condition whereby the player character CAA has touched an arbitrary part of the enemy character string T a predetermined number of times is set to be the mode switch condition whereby the mode is switched from the normal mode to the superior mode, is described below. An example in which the predetermined number of times is "3" is described below. Note that the predetermined number of times may be 4 or more, or may be 2 or less.

Figure 12:
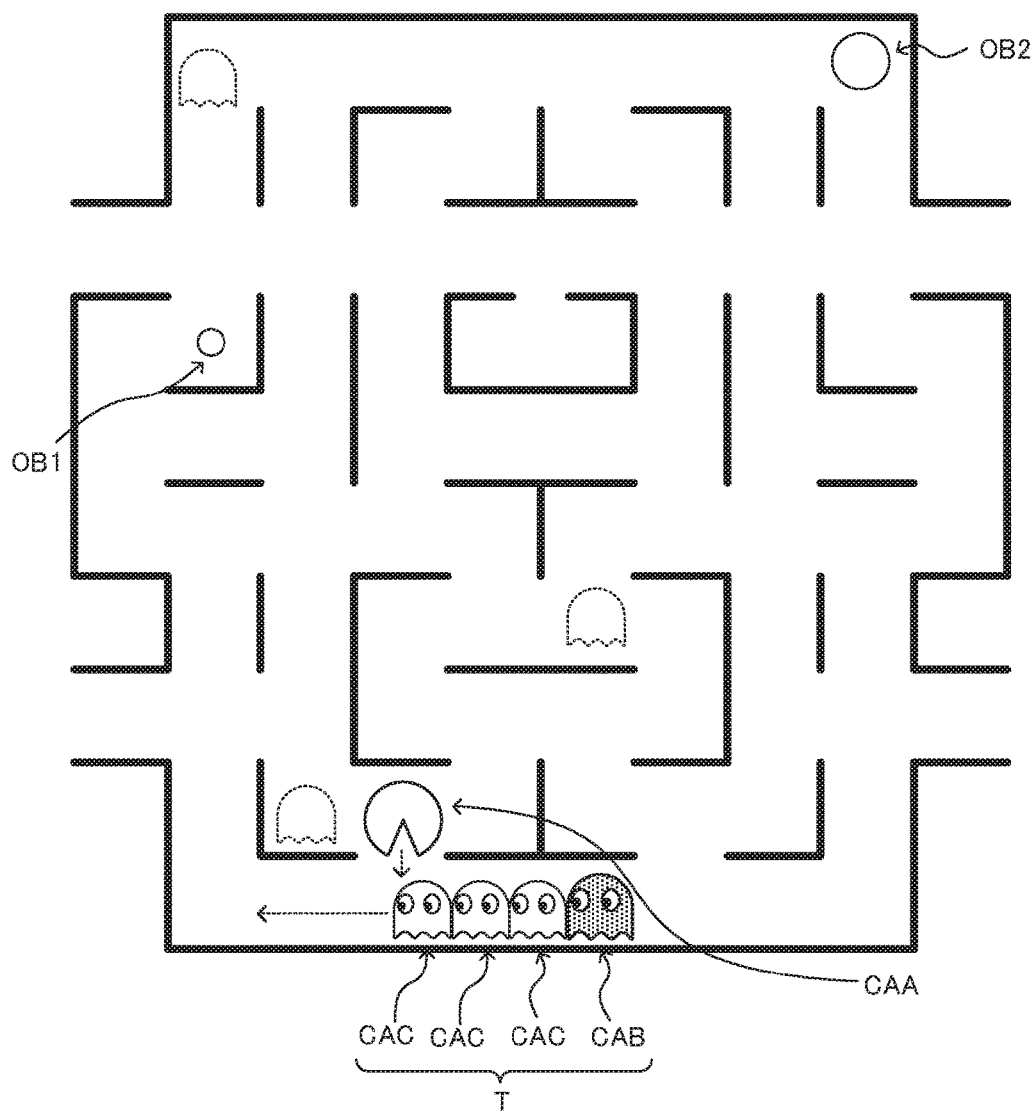
FIG. 12 is an example of a diagram illustrating a condition whereby the mode is switched to a superior mode.
Figure 13:
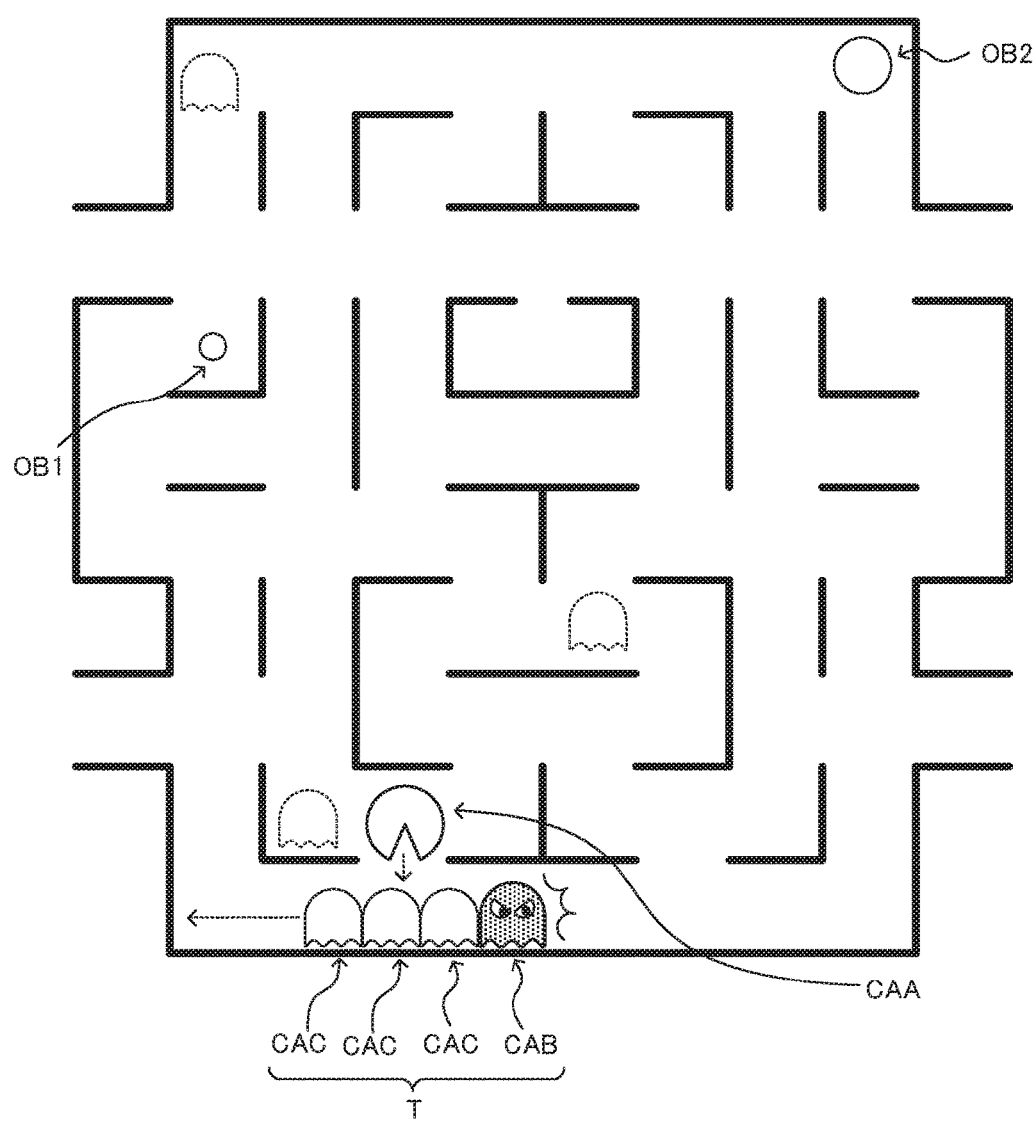
FIG. 13 is an example of a diagram (that follows FIG. 12) illustrating a condition whereby the mode is switched to a superior mode.

When the enemy character string T has been set to the normal mode, the game control section 214 maintains the enemy character string T in the normal mode (see FIG. 12) during a period in which the touch count of the player character CAA with respect to the enemy character string T is "1" or "2", and sets the enemy character string T to the superior mode (see FIG. 13) when the touch count has reached "3". FIG. 13 (see the lower left) illustrates the enemy character string T immediately after being set to the superior mode.

When the motion mode of the enemy character string T has been changed from the normal mode to the superior mode, the display control section 212 changes the expressions of the main character CAB and the sub-character(s) CAC included in the enemy character string T as illustrated in FIG. 13, for example. FIG. 13 illustrates an example in which the main character CAB wears an angry expression, and the sub-characters CAC wear no expression in the superior mode. Note that at least either the main character CAB or the sub-character(s) CAC may be caused to wear an angry expression, a joyful expression, a cheerful expression, or the like in the superior mode.

The game control section 214 sets the main character CAB to the superior mode when the player character CAA has touched a sub-character CAC among the sub-characters CAC included in the enemy character string T three times in total even when the player character CAA has not touched the main character CAB included in the enemy character string T.

For example, the game control section 214 sets the main character CAB to the superior mode when the player character CAA has touched only the first sub-character CAC included in the enemy character string T (i.e., the sub-character CAC that is situated at the head of the enemy character string T) three times. The game control section 214 also sets the main character CAB to the superior mode when the player character CAA has touched the first sub-character CAC once, has touched the second sub-character CAC once, and has touched the third sub-character CAC once.

Specifically, even when the main character CAB has not been touched by the player character CAA, the main character CAB is displayed in an angry state in response to a situation in which the sub-characters CAC have been touched by the player character CAA. Therefore, the player is given an impression that the main character CAB holds a sense of fellowship (unity) with respect to the sub-characters CAC.

The terminal device 20 thus makes it possible to emphasize the reaction of the main character CAB when the enemy character string T is set to the superior mode from the normal mode, and prompt the player to become tense.

Note that the display control section 212 may cause the outward appearance of the main character CAB to differ between a period in which the touch count is "1" and a period in which the touch count is "2". For example, the display control section 212 may cause the main character CAB to wear an unpleasant expression during a period in which the touch count is "1", and cause the main character CAB to wear a more unpleasant expression during a period in which the touch count is "2". This makes it possible for the player to determine the touch count at which the enemy characters are set to the superior mode in view of the expression of the main character CAB.

4-7. Character Motion Control Process in Superior Mode

Figure 14:
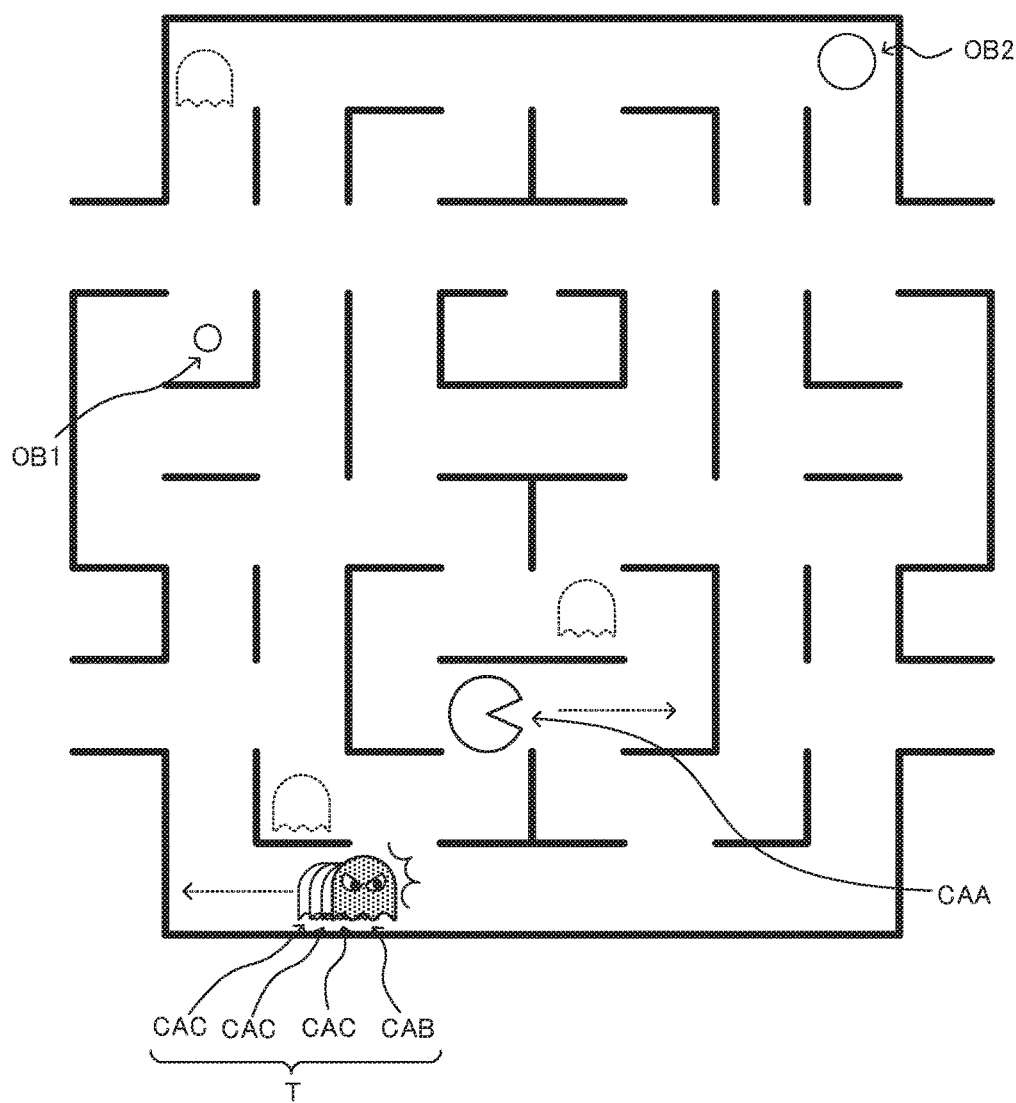
FIG. 14 is an example of a diagram illustrating the motion of an enemy character string immediately after the mode has been switched to a superior mode.
Figure 15:
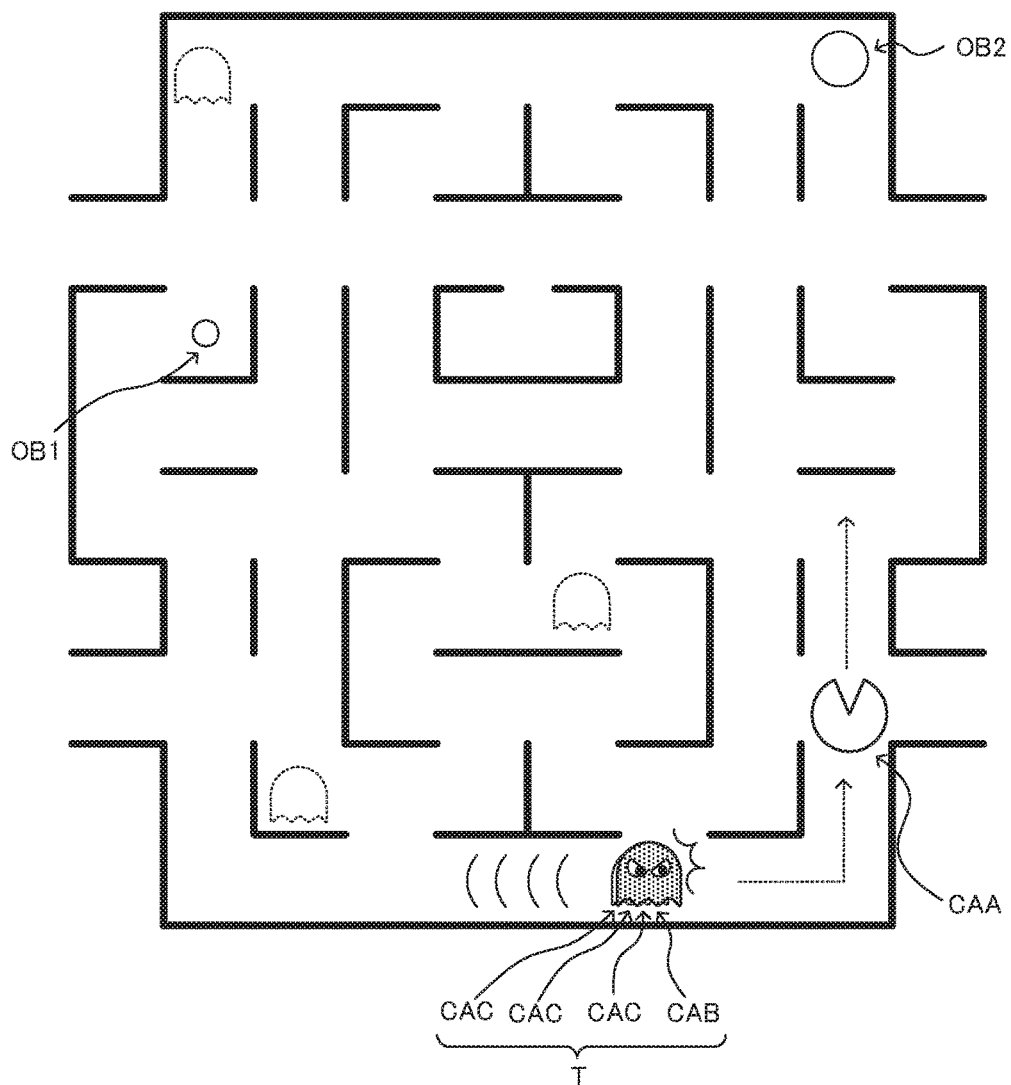
FIG. 15 is an example of a diagram (that follows FIG. 14) illustrating the motion of an enemy character string in a superior mode.

When the enemy character string T has been set to the superior mode, the game control section 214 decreases the total length of the enemy character string T as illustrated in FIGS. 14 and 15 so that one or more sub-characters CAC are hidden behind the main character CAB, for example. FIG. 15 illustrates an example in which some of the sub-characters CAC are hidden behind the main character CAB. Note that the game control section 214 may decrease the total length of the enemy character string T so that all of the sub-characters CAC are hidden behind the main character CAB. In such a case, the display control section 212 need not display the sub-characters CAC. The main character CAB is hereinafter referred to as "enemy character string T" when all or some of the sub-characters CAC are hidden behind the main character CAB.

When the enemy character string T has been set to the superior mode, the game control section 214 sets the moving speed of the enemy character string T to the normal speed, and sets the movement type of the enemy character string T to "chase type".

In this case, the enemy character string T chases the player character CAA immediately after the mode has been set to the superior mode from the normal mode in a state in which some or all of the sub-characters CAC are hidden behind the main character CAB.

Specifically, a situation in which the main character CAB chases the player character CAA while protecting the sub-characters CAC, is displayed to the player. Therefore, the player is given an impression that the main character CAB is strong in the superior mode.

Figure 16:
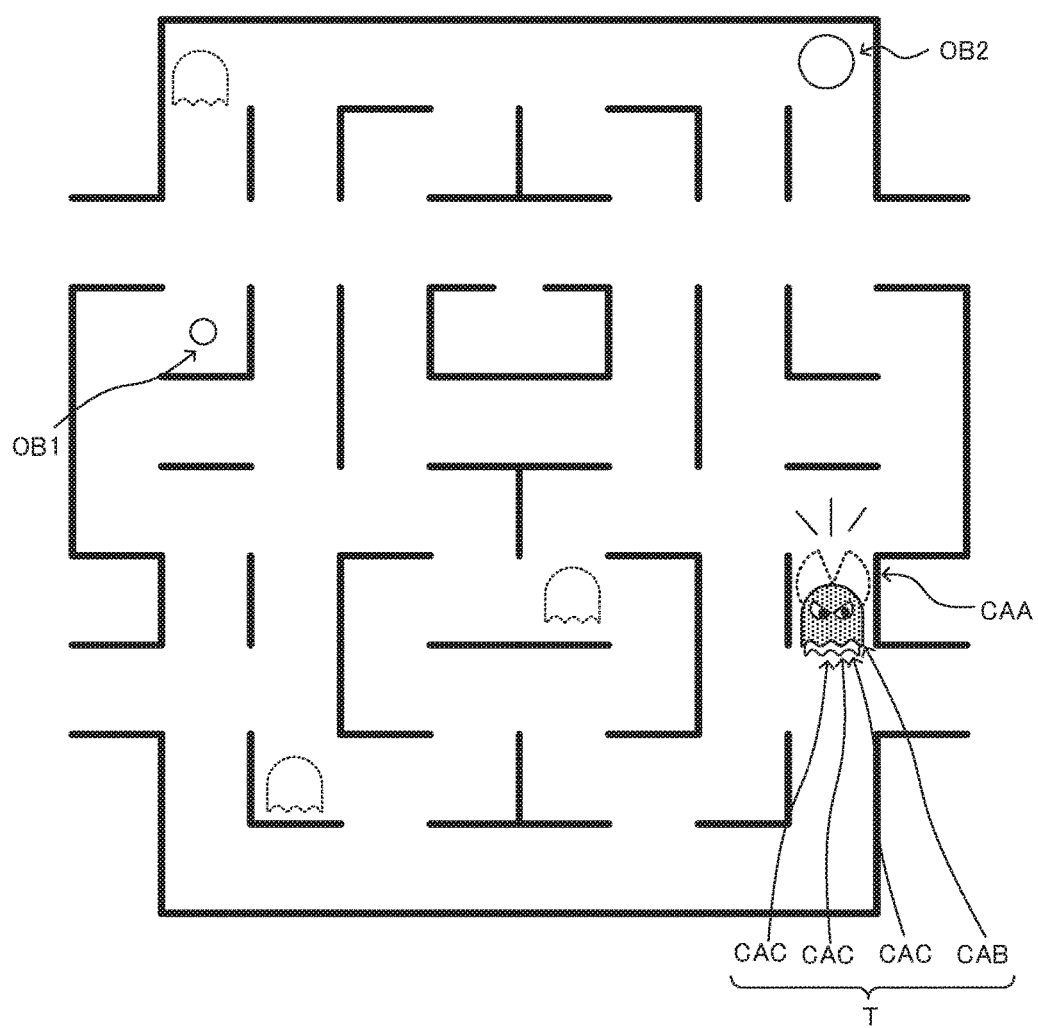
FIG. 16 is an example of a diagram (that follows FIG. 15) illustrating the motion of an enemy character string in a superior mode.

When the main character CAB included in the enemy character string T has touched the player character CAA (see FIG. 16), the display control section 212 deletes the player character CAA from the game screen, and the game control section 214 determines that the player has made a mistake (i.e., the player object is damaged).

4-8. Mode Switch Condition Whereby Mode is Switched from Superior Mode to Normal Mode When a predetermined time (e.g., 4 seconds) has elapsed after the enemy characters have been set to the superior mode, the game control section 214 sets the motion mode of the enemy character string T to the normal mode. Specifically, the game control section 214 sets a limit to the time in which the enemy characters are set to the superior mode (i.e., the time in which the player is tensed). It is considered that the player is psychologically affected in an advantageous way by setting a time limit, and it is possible to bring a feeling of tension in the superior mode, since a human normally cannot maintain a tense state for a long time.

4-9. Score and Bonus

The game management section 217 calculates the score of the player after the start of the game process until the game screen is cleared, or the player makes a mistake. The game management section 217 reflects the points acquired by the player in the score included in the user information 273 when the game screen has been cleared, and does not reflect the points acquired by the player in the score included in the user information 273 when the player has made a mistake.

The game management section 217 records a specific object (e.g., an item that can be used when the next game screen is displayed) that has been deleted (acquired) by the player character CAA during a period until the game screen is cleared or the player makes a mistake after the game process has started. The game management section 217 adds the item acquired by the player to the item list included in the user information 273 when the game screen has been cleared, and does not add the item acquired by the player to the item list when the player has made a mistake.

The display control section 212 successively displays the score of the player and the object acquired by the player within the game screen during a period until the game screen is cleared or the player makes a mistake after the game process has started. Note that the score and the item are omitted in FIGS. 4 to 16. The display control section 212 displays the score and the item list of the player within the game screen when the game screen has been cleared.

The game management section 217 provides a bonus to the player when the game screen has been cleared in a state in which the enemy characters (main character CAB and sub-character(s) CAC) have not been set to the superior mode. The bonus may be an item that can be used when the next game screen is displayed, or may be points that are added to the score.

The game management section 217 provides a bonus to the player when the game screen has been cleared in a state in which the player character CAA has not touched the enemy characters (main character CAB and sub-character(s) CAC). The bonus may be an item that can be used when the next game screen is displayed, or may be points that are added to the score.

Specifically, the player can obtain a bonus by preventing a situation in which the enemy characters are set to the superior mode, or preventing a situation in which the player character CAA touches the enemy characters (main character CAB and sub-character(s) CAC), instead of merely causing the player character CAA to satisfy the clear condition so that the next game screen is displayed.

4-9-1. Flow of Game Process

FIG. 17 is a flowchart illustrating the flow of the game process performed by the processing section 200.

The game process is performed in principle by the processing section 200 included in the terminal device 20. Note that the processing section 200 may perform the entirety or part of the game process in cooperation with the server device 10. The function of each element included in the processing section 200 has been described above, and the following description illustrates the flow of the game process in which each step is performed by the processing section 200.

The processing section 200 starts displaying the game screen (S11).

The processing section 200 controls the motion of the enemy characters (main character CAB and sub-character(s) CAC) in the normal mode (S13 to S23). The details of the flow (S13 to S23) in the normal mode are described later.

When a predetermined mode switch condition has been satisfied (S19Y) during a period in which the enemy character string T is controlled in the normal mode (S13 to S23), the processing section 200 controls the motion of the enemy character string T in the inferior mode for a predetermined time (S41 to S51). The details of the flow (S41 to S51) in the inferior mode are described later.

When another predetermined mode switch condition has been satisfied (S21Y) during a period in which the enemy character string T is controlled in the normal mode (S13 to S23), the processing section 200 controls the motion of the enemy character string T in the superior mode for a predetermined time (S61 to S65). The details of the flow (S61 to S65) in the superior mode are described later.

When a predetermined clear condition has been satisfied (S23Y) during a period in which the enemy character string T is controlled in the normal mode (S13 to S23), the processing section 200 updates the score, notifies the player that the game screen has been cleared (S25), and terminates the game process illustrated in FIG. 17.

When a predetermined mistake condition has been satisfied (S63Y) during a period in which the enemy character string T is controlled (operated) in the superior mode (S61 to S65), the processing section 200 deletes the player character CAA from the game screen, notifies the player that the player has made a mistake (S75), and terminates the game process illustrated in FIG. 17.

Note that the steps illustrated in FIG. 17 may be appropriately changed in order and the like.

4-9-2. Flow of Control Process in Normal Mode

The flow (S13 to S23) of the game process performed by the processing section 200 in the normal mode is described below.

The processing section 200 controls the motion of the enemy character string T in the normal mode (S13). Note that the processing section 200 initially moves only the main character CAB while setting a plurality of sub-characters CAC to a stationary state at a plurality of positions within the game screen. The processing section 200 does not display the special object OB within the game screen during a period until all of the sub-characters CAC are connected to the main character CAB, for example.

The processing section 200 determines whether or not the player character CAA has approached a sub-character CAC among the sub-characters CAC set to a stationary state (S15), and repeats this process when the player character CAA has not approached a sub-character CAC among the sub-characters CAC set to a stationary state (S15N). When the player character CAA has approached a sub-character CAC among the sub-characters CAC set to a stationary state (S15Y), the processing section 200 changes the expression of the sub-character CAC, and connects the sub-character CAC to the main character CAB (S17).

The processing section 200 determines whether or not the special object OB2 has been deleted (S19), and repeats this process when the special object OB2 has not been deleted (S19N). When the special object OB2 has been deleted (S19Y), the processing section 200 performs the process in the inferior mode (S41). Note that the determination process (S19) may be omitted during a period until the special object OB appears within the game screen after the game process has started.

The processing section 200 determines whether or not the touch count of the player character CAA with respect to the enemy character string T has reached a predetermined threshold value ("3") (S21), and repeats this process when the touch count has not reached the predetermined threshold value (S21N). When the touch count has not reached the predetermined threshold value (S21Y), the processing section 200 performs the process in the superior mode (S61).

The processing section 200 determines whether or not all of the objects OB1 have been deleted (S23), and repeats this process when all of the objects OB1 have not been deleted (S23N). When all of the objects OB1 have been deleted (S23Y), the processing section 200 performs the process that notifies the player that the game screen has been cleared (S25).

Note that the above steps may be appropriately changed in order and the like.

4-9-3. Flow of Process in Inferior Mode

The flow (S41 to S51) of the game process performed by the processing section 200 in the inferior mode is described below.

The processing section 200 controls the motion of the enemy characters in the inferior mode (S41).

The processing section 200 determines whether or not the player character CAA has touched the sub-character CAC included in the enemy character string T (S43), and repeats this process when the player character CAA has not touched the sub-character CAC included in the enemy character string T (S43N). When the player character CAA has touched the sub-character CAC included in the enemy character string T (S43Y), the processing section 200 deletes the sub-character CAC touched by the player character CAA, and decreases the moving speed of the enemy character string T (S45).

The processing section 200 determines whether or not the player character CAA has touched the head (i.e., main character CAB) of the enemy character string T (S47), and repeats this process when the player character CAA has not touched the head of the enemy character string T (S47N). When the player character CAA has touched the head of the enemy character string T (S47Y), the processing section 200 sequentially deletes the enemy characters (main character CAB and one or more sub-characters CAC) included in the enemy character string T in order from the head (S49).

The processing section 200 determines whether or not a predetermined time has elapsed after setting the enemy characters to the inferior mode (S41) (S51), and repeats this process when the predetermined time has not elapsed (S51N). When the predetermined time has elapsed (S51Y), the processing section 200 performs the process in the normal mode (S13).

Note that the above steps may be appropriately changed in order and the like.

4-9-4. Flow of Process in Superior Mode

The flow (S61 to S65) of the game process performed by the processing section 200 in the superior mode is described below.

The processing section 200 controls the motion of the enemy character string T in the superior mode (S61).

The processing section 200 determines whether or not the player character CAA has touched the main character CAB included in the enemy character string T (S63), and repeats this process when the player character CAA has not touched the main character CAB included in the enemy character string T (S63N). When the player character CAA has touched the main character CAB included in the enemy character string T (S63Y), the processing section 200 performs the process that notifies the player that the player has made a mistake (S75).

The processing section 200 determines whether or not a predetermined time has elapsed after setting the enemy characters to the superior mode (S61) (S65), and repeats this process when the predetermined time has not elapsed (S65N). When the predetermined time has elapsed (S65Y), the processing section 200 performs the process in the normal mode (S13).

Note that the above steps may be appropriately changed in order and the like.

As described above, the terminal device 20 includes the display control section 212 that displays the enemy character string T that includes the main character CAB and the sub-character(s) CAC connected to the main character CAB, and the player character CAA that can be operated by the player, within the game screen in which the virtual walls that limit the moving direction of the characters are provided.

The terminal device 20 also includes the game control section 214 (i.e., object control section) that controls the motion of the enemy character string T within the game screen in the normal mode, and controls the motion of the player character CAA within the game screen corresponding to the operation performed by the player.

The terminal device 20 includes the game control section 214 (i.e., switch section) that switches the motion mode of the enemy character string T from the normal mode to the inferior mode in which the enemy character string T is inferior as compared with the normal mode, at a timing at which the player character CAA has touched the special object OB2.

Specifically, the terminal device 20 is configured so that the enemy character string T can be switched between the normal mode and the inferior mode, and at least the main character CAB can also be switched to the superior mode. When the player character CAA has touched the sub-character CAC one or more times in a state in which the enemy character string T has been set to the normal mode, the motion mode of the main character CAB is switched to the superior mode in which the main character CAB is superior as compared with the normal mode, even when the player character CAA has not touched the main character CAB.

Specifically, the main character CAB is set to the superior mode when the sub-character CAC has been touched instead of the main character CAB. Therefore, the player is given an impression that the main character CAB holds a sense of unity (fellowship) with respect to the sub-character(s) CAC.

The terminal device 20 thus makes it possible to emphasize the reaction of the main character CAB when the mode is switched from the normal mode to the superior mode, and prompt the player to become tense.

4-10. Modifications 4-10-1. Game Screen

When the game screen (hereinafter referred to as "previous game screen") has been cleared, the game management section 217 may allow the player to play the game on a new game screen.

In this case, the game control section 214 may increase the difficulty level of the new game screen as compared with the difficulty level of the previous game screen.

The game control section 214 may set the difficulty level of the new game screen to be higher than the difficulty level of the previous game screen. The difficulty level is set by appropriately setting at least one parameter among the number of sub-characters CAC that can be connected to the enemy character string T, the number of enemy character strings T that appear within the game screen (i.e., the number of main characters CAB), the moving speed of the enemy character string T, and the like.

The game control section 214 may cause the same enemy character string T as the enemy character string T that appeared within the previous game screen to appear within the new game screen. The game control section 214 may set the power of the enemy character string T displayed within the new game screen to be higher than the power of the enemy character string T displayed within the previous game screen.

Note that the power of the enemy character string T is set as described above.

4-10-2. Gauge

The display control section 212 may display the number of times that the player character CAA can touch the enemy character string T set to the superior mode (i.e., the number of times that the player character CAA can touch the enemy character string T without being deleted) in an arbitrary area within the game screen. The number of times that the player character CAA can touch the enemy character string T is displayed using a gauge (not illustrated in FIGS. 4 to 16), for example.

The display control section 212 may display the time until the motion of the enemy character string T is set to the normal mode from the superior mode in an arbitrary area within the game screen. The time until the motion of the enemy character string T is set to the normal mode from the superior mode is displayed using a gauge (not illustrated in FIGS. 4 to 16), for example.

The display control section 212 may display the time until the motion of the enemy character string T is set to the normal mode from the inferior mode in an arbitrary area within the game screen. The time until the motion of the enemy character string T is set to the normal mode from the inferior mode is displayed using a gauge (not illustrated in FIGS. 4 to 16), for example.

4-10-3. Functions Implemented by Processing Section

The function of each element included in the processing section 200 may be assigned in an arbitrary way. For example, part or the entirety of the function of the game management section 217 may be implemented by the game control section 214. Part or the entirety of the function of the display control section 212 may be implemented by the game control section 214. Part or the entirety of the function of the game control section 214 may be implemented by the display control section 212. The terminal device 20 may include a dedicated circuit (hardware) that implements part or the entirety of the functions of the processing section 200.

4-10-4. Other

The invention is not limited to the embodiments described above. Various modifications and variations may be made of the embodiments. Any term cited with a different term having a broader meaning or the same meaning at least once in the specification and the drawings may be replaced by the different term in any place in the specification and the drawings.

For example, each game may be provided to the terminal device 20 using a single server device 10, or a server system may be implemented by a plurality of server devices 10 that operate in synchronization, and each game may be provided to the terminal device 20 using the server system.

Although the embodiments have been described above taking an example in which the game provided by the server device 10 is executed by the terminal device 20, each function of the processing section 200 of the terminal device 20 (except for the operation detection processing section 211) and the game program may be implemented and executed by the server device 10, and the terminal device 20 may implement the game through an operation input and streaming image display.

Although the embodiments have been described above taking an example in which the terminal device according to the invention is applied to a game device, the terminal device according to the invention may be applied to an arbitrary terminal device that allows the user to perform an operation input using a touch panel (e.g., smartphone, tablet-type information terminal device, personal computer, monitor, or TV).

The invention includes various other configurations substantially the same as the configurations described above in connection with the embodiments (e.g., a configuration having the same function, method, and results, or a configuration having the same objective and effects). The invention also includes a configuration in which an unsubstantial element described above in connection with the embodiments is replaced by another element. The invention also includes a configuration having the same effects as those of the configurations described above in connection with the embodiments, or a configuration capable of achieving the same objective as that of the configurations described above in connection with the embodiments. The invention further includes a configuration in which a known technique is added to the configurations described above in connection with the embodiments.

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

What is claimed is:

1. A computer-readable non-transitory information storage medium storing a program that causes a computer to implement a game, the program causing the computer to function as:
   a display control section that performs a process that displays an object string and a player object within a game screen, the object string including a main object, and at least one sub-object that is connected to the main object, the player object being an object that can be operated by a player, and virtual walls that limit a moving direction of each of the main object, the sub-object and the player object being provided within the game screen;
   an object control section that controls a motion of the object string within the game screen in a first mode, and controls a motion of the player object within the game screen in response to an operation performed by the player; and
   a mode switch section that switches a motion mode of the object string from the first mode to a second mode when the player object has satisfied a predetermined condition, the second mode being a mode in which the object string is inferior as compared with the first mode,
   wherein the mode switch section switches the motion mode of the main object to a third mode when the player object and the sub-object have satisfied a predetermined positional relationship condition in a state in which the object string has been set to the first mode, the third mode being a mode in which the main object is superior as compared with the first mode.

2. The information storage medium as defined in claim 1, wherein the player object is damaged when the main object in the third mode and the player object have satisfied a predetermined positional relationship condition.

3. The information storage medium as defined in claim 1, wherein the object string in the first mode moves so that the sub-object leads the object string.

4. The information storage medium as defined in claim 1, wherein the object string in the second mode moves so that the main object leads the object string.

5. The information storage medium as defined in claim 1, wherein the object string moves in a state in which the object string has a reduced total length when the main object is in the third mode.

6. The information storage medium as defined in claim 1, wherein the mode switch section sets a limit to a time in which the main object is in the third mode.

7. The information storage medium as defined in claim 1, wherein the program causes the computer to further function as a game management section that provides a bonus to the player when the player object has satisfied a predetermined clear condition relating to the game screen in a state in which the main object has not been set to the third mode.

8. The information storage medium as defined in claim 7, wherein the game management section provides the bonus to the player when the player object has satisfied a predetermined clear condition relating to the game screen without touching or approaching the object string.

9. The information storage medium as defined in claim 1, wherein, when the player object has touched or approached an object that is at least one of the main object and the sub-object included in the object string in a state in which the object string is in the second mode, the object control section deletes the object to decrease the number of objects included in the object string, and
wherein the program causes the computer to further function as a game management section that upgrades a score of the player as the number of objects that have been successively deleted increases.

10. The information storage medium as defined in claim 9, wherein, when the number of objects included in the object string has decreased, the object control section decreases a moving speed of the object string according to the number of objects that have been deleted.

11. The information storage medium as defined in claim 1, wherein, when a candidate object that is a candidate for the sub-object and has been placed within the game screen in advance by the display control section satisfies a predetermined condition, the display control section sets the candidate object to be the sub-object and connects the sub-object to the main object.

12. A server that implements a game, the server comprising:
a display control section that performs a process that displays an object string and a player object within a game screen, the object string including a main object, and at least one sub-object that is connected to the main object, the player object being an object that can be operated by a player, and virtual walls that limit a moving direction of each of the main object, the sub-object and the player object being provided within the game screen;
an object control section that controls a motion of the object string within the game screen in a first mode, and controls a motion of the player object within the game screen in response to an operation performed by the player, and
a mode switch section that switches a motion mode of the object string from the first mode to a second mode when the player object has satisfied a predetermined condition, the second mode being a mode in which the object string is inferior as compared with the first mode,
wherein the mode switch section switches the motion mode of the main object to a third mode when the player object and the sub-object have satisfied a predetermined positional relationship condition in a state in which the object string has been set to the first mode, the third mode being a mode in which the main object is superior as compared with the first mode.

13. A game device that implements a game, the game device comprising:
a display control section that performs a process that displays an object string and a player object within a game screen, the object string including a main object, and at least one sub-object that is connected to the main object, the player object being an object that can be operated by a player, and virtual walls that limit a moving direction of each of the main object, the sub-object and the player object being provided within the game screen;
an object control section that controls a motion of the object string within the game screen in a first mode, and controls a motion of the player object within the game screen in response to an operation performed by the player, and
a mode switch section that switches a motion mode of the object string from the first mode to a second mode when the player object has satisfied a predetermined condition, the second mode being a mode in which the object string is inferior as compared with the first mode,
wherein the mode switch section switches the motion mode of the main object to a third mode when the player object and the sub-object have satisfied a predetermined positional relationship condition in a state in which the object string has been set to the first mode, the third mode being a mode in which the main object is superior as compared with the first mode.

* * * * *